(12) United States Patent
Sorimoto

(10) Patent No.: US 10,882,235 B2
(45) Date of Patent: Jan. 5, 2021

(54) UNDERCUT PROCESSING MECHANISM, MOLDING DIE AND MOLDED PRODUCT

(71) Applicant: TECHNOCRATS CORPORATION, Hiroshima (JP)

(72) Inventor: Masanori Sorimoto, Hiroshima (JP)

(73) Assignee: TECHNOCRATS CORPORATION, Hiroshima (JP)

( * ) Notice: Subject to any disclaimer, the term of this patent is extended or adjusted under 35 U.S.C. 154(b) by 401 days.

(21) Appl. No.: 15/906,158

(22) Filed: Feb. 27, 2018

(65) Prior Publication Data

US 2018/0243960 A1 Aug. 30, 2018

(30) Foreign Application Priority Data

Feb. 28, 2017 (JP) .................. 2017-036181
Dec. 4, 2017 (JP) .................. 2017-232813

(51) Int. Cl.
*B29C 45/44* (2006.01)
*B22D 17/22* (2006.01)
*B29C 45/33* (2006.01)

(52) U.S. Cl.
CPC .......... *B29C 45/44* (2013.01); *B22D 17/2236* (2013.01); *B29C 45/4435* (2013.01); *B29C 45/33* (2013.01)

(58) Field of Classification Search
CPC ................................................ B29C 45/4435
See application file for complete search history.

(56) References Cited

U.S. PATENT DOCUMENTS

| 8,926,316 B2 | 1/2015 | Sorimoto |
| 2014/0141115 A1 | 5/2014 | Sorimoto |

FOREIGN PATENT DOCUMENTS

| EP | 2735414 A1 | 5/2014 |
| JP | S6370316 U | 5/1988 |
| JP | 2010155381 A | 7/2010 |
| JP | 2013176958 A | 9/2013 |
| KR | 200441433 Y1 | 8/2008 |

OTHER PUBLICATIONS

Extended European Search Report for European Application No. 18158671.0, dated Jul. 2, 2018 (9 pages).
English language abstract of KR 200441433, dated Aug. 18, 2008.
English language abstract of JP S6370316, dated May 11, 1988.
English language abstract of JP2010155381, dated Jul. 15, 2010.
English language abstract of JP2013176958, dated May 11, 1988.
Abstract of EP 2735414, dated May 28, 2014.
Communication Pursuant to Article 94(3) for European Application No. 18158671.0, dated Mar. 2, 2020 (4 pages).

*Primary Examiner* — Robert B Davis
(74) *Attorney, Agent, or Firm* — Kagan Binder, PLLC

(57) ABSTRACT

An undercut processing mechanism is attached to and used in a molding die for forming a molded product having an undercut portion and allows the undercut portion, projecting in a direction intersecting a demolding direction of the molded product, to be demolded. The undercut processing mechanism includes: a holder attached to the molding die so as to be movable in a demolding direction of the molded product P; a sliding piece slidable relative to the holder and configured to form the undercut portion; and a retaining piece fixed to the molding die or formed so as to be integrated with the molding die, which retaining piece slidably retains the sliding piece. In demolding the molded product, the sliding piece moves in the direction in which the undercut portion can be demolded, by moving the holder in the demolding direction of the molded product.

12 Claims, 24 Drawing Sheets

UNDERCUT PROCESSING MECHANISM, MOLDING DIE AND MOLDED PRODUCT

CROSS REFERENCE TO THE RELATED APPLICATION

This application is based on and claims Convention priority to Japanese patent application No. 2017-036181, filed Feb. 28, 2017, and also to Japanese patent application No. 2017-232813, filed Dec. 4, 2017, the entire disclosure of which are herein incorporated by reference as a part of this application.

BACKGROUND OF THE INVENTION

Field of the Invention

The present invention relates to: an undercut processing mechanism that is attached to and used in a molding die for forming a molded product having an undercut portion; a molding die to which such a mechanism is attached; and a molded product formed by such a molding die.

Description of Related Art

For a molding die for forming a molded product having an undercut portion, multiple undercut processing mechanisms that correspond to forms of undercut portions have been developed. As an undercut processing mechanism, for example, a component called loose core is generally used.

It is difficult to form a molded product having a boss, that has a hollow portion and that projects in a direction intersecting a demolding direction in which the entire molded product is demolded, by means of a conventional undercut processing mechanism using a loose core. The present inventor has already proposed an undercut processing mechanism that allows a boss, that is to be an undercut portion, to be easily demolded in the case of forming a molded product (see, for example, JP Laid-open Patent Publication No. 2010-155381).

The undercut processing mechanism disclosed in JP Laid-open Patent Publication No. 2010-155381 includes: a holder disposed within a stationary mold or a movable mold of a molding die; and a molding core for forming an undercut portion. The molding core includes a first core and a second core, and the first core and the second core have side surfaces that are adjacent to and inclined relative to each other. The undercut processing mechanism is configured to allow an undercut portion to be demolded by the first and second cores sliding along their side surfaces within the holder.

According to the undercut processing mechanism disclosed in JP Laid-open Patent Publication No. 2010-155381, it is made easy to form a molded product having a shape in which it is difficult to form the molded product with a conventional undercut processing mechanism using a loose core. Furthermore, a support rod, a guide rod and the like are rendered to be unnecessary, and thus, the undercut processing mechanism can be made compact as compared to the conventional undercut processing mechanism using the loose core.

The present invention proposes: an undercut processing mechanism that can make it easy to form a molded product having an undercut portion as with the undercut processing mechanism disclosed in JP Laid-open Patent Publication No. 2010-155381 and can be made compact, with a configuration different from that of the undercut processing mechanism disclosed in JP Laid-open Patent Publication No. 2010-155381; a molding die to which such a mechanism is attached; and a molded product formed by such a molding die.

SUMMARY OF THE INVENTION

An object of the present invention is to provide: an undercut processing mechanism that can be made compact and allows an undercut portion to be easily demolded; a molding die to which such a mechanism is attached; and a molded product formed by such a molding die.

The present invention is directed to an undercut processing mechanism that is attached to and used in a molding die for forming a molded product having an undercut portion. The undercut processing mechanism comprises: a holder attached to the molding die so as to be movable in a demolding direction of the molded product; a sliding piece slidable relative to the holder and configured to form the undercut portion; and a retaining piece fixed to the molding die or formed so as to be integrated with the molding die, the retaining piece slidably retaining the sliding piece, wherein in demolding the molded product, the sliding piece is moved in a direction in which the undercut portion is enabled to be demolded, by moving the holder in the demolding direction of the molded product.

In the undercut processing mechanism according to the present invention, the sliding piece and the retaining piece may be adjacently aligned with each other in a movement direction of the holder.

In the undercut processing mechanism according to the present invention, the holder may be configured to protrude the molded product during an operation of protruding the molded product.

In the undercut processing mechanism according to the present invention, the holder and the retaining piece each may include a restrictor configured to restrict a movement direction of the sliding piece to the direction in which the undercut portion is enabled to be demolded.

In the undercut processing mechanism according to the present invention, the restrictor of the holder may be provided so as to engage with the sliding piece such that the sliding piece is slidable relative to the holder in the direction in which the undercut portion is enabled to be demolded, and the restrictor of the retaining piece may be provided so as to engage with the sliding piece such that the sliding piece is slidable relative to the retaining piece in a direction orthogonal to the direction in which the undercut portion is enabled to be demolded.

In the undercut processing mechanism according to the present invention, the sliding piece may include a molding member configured to form a hollow portion or a space portion of the undercut portion so as to form the molded product having the hollow portion or the space portion in the undercut portion.

In the undercut processing mechanism according to the present invention, the sliding piece includes a plurality of split sliders, and at least two of the plurality of sliders may move in directions that are different from a movement direction of the holder and that are different from each other, during movement of the holder.

The undercut processing mechanism according to the present invention further may include an outer holder fixed to the molding die and configured to slide the holder, so as to prevent wear of the molding die.

In the undercut processing mechanism according to the present invention, the holder may have an outer peripheral surface that is a sliding surface and that is partially or entirely formed in a tapered shape, so as to prevent wear of the outer peripheral surface and/or the molding die.

A molding die of the present invention includes the undercut processing mechanism.

A molded product of the present invention is formed by the undercut processing mechanism or the molding die.

According to the undercut processing mechanism of the present invention, the sliding piece is moved in a direction in which the undercut portion is enabled to be demolded by moving the holder in the demolding direction of the molded product, and therefore, the undercut portion can be easily demolded, while the undercut processing mechanism is made compact.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
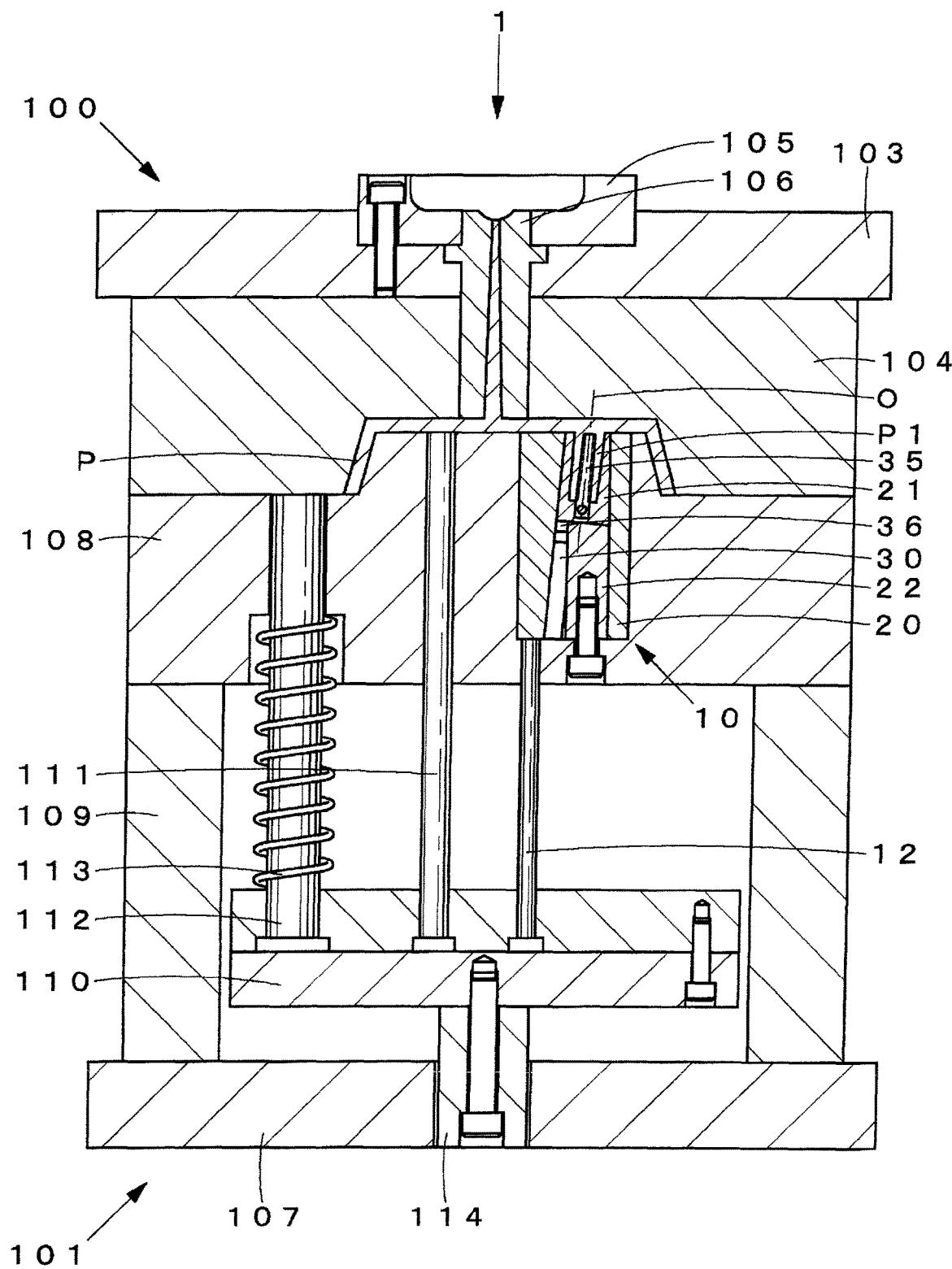
FIG. 1 is a cross-sectional view of a molding die according to a first embodiment of the present invention during clamping.
Figure 2:
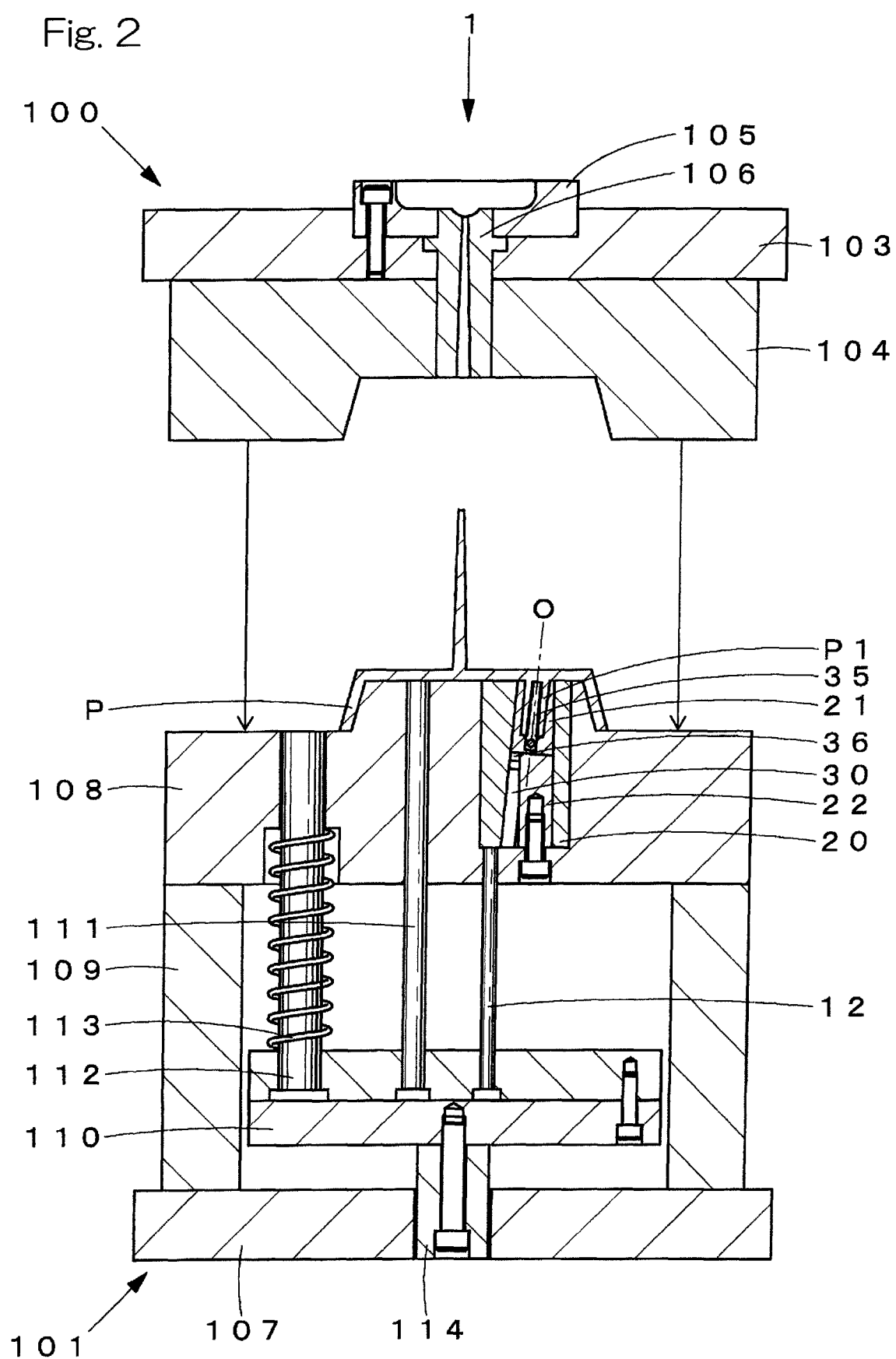
FIG. 2 is a cross-sectional view of the molding die in FIG. 1 after the molding die is opened.
Figure 3:
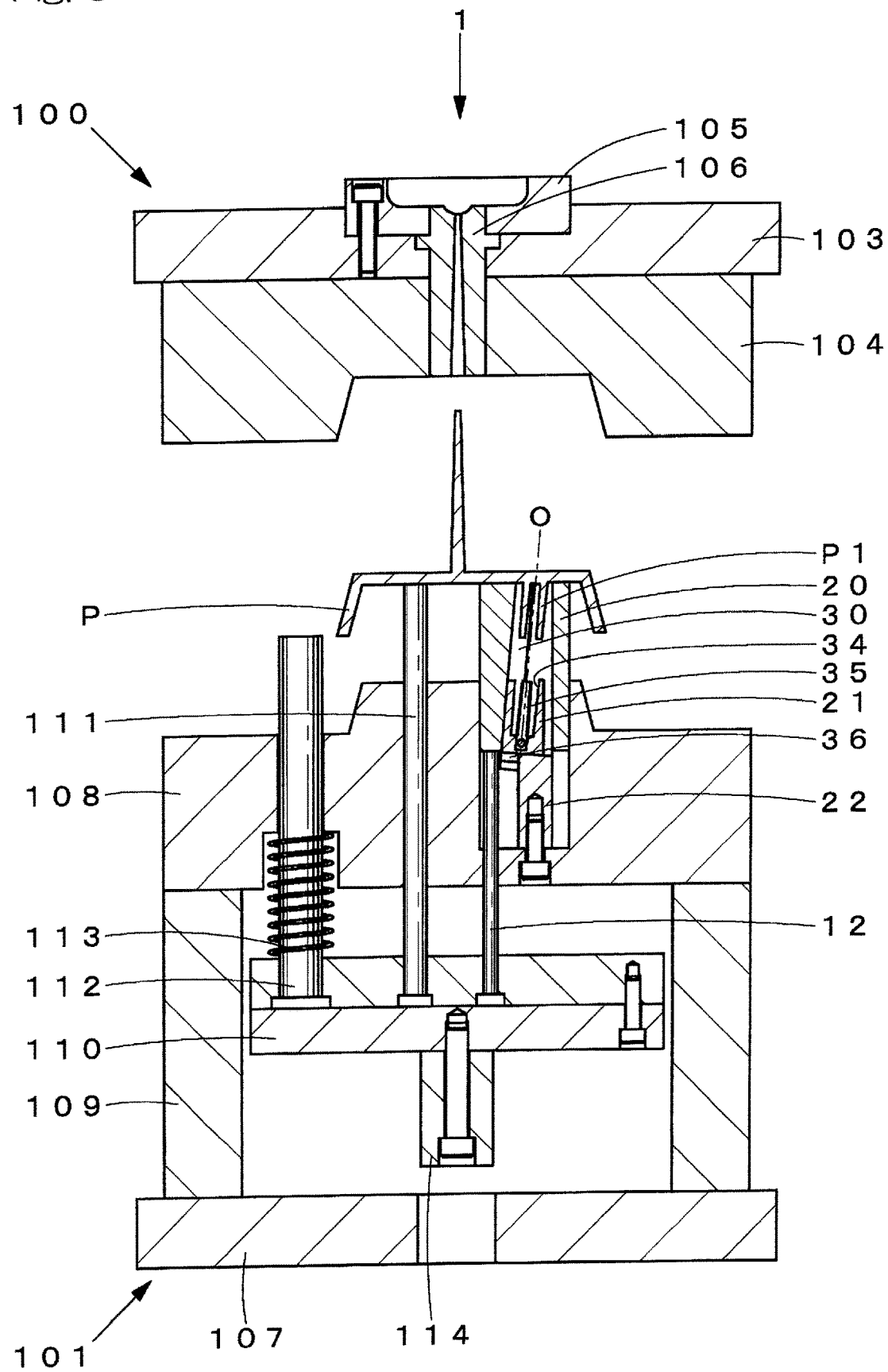
FIG. 3 is a cross-sectional view of the molding die in FIG. 1 after an operation of protruding a molded product.
Figure 4:
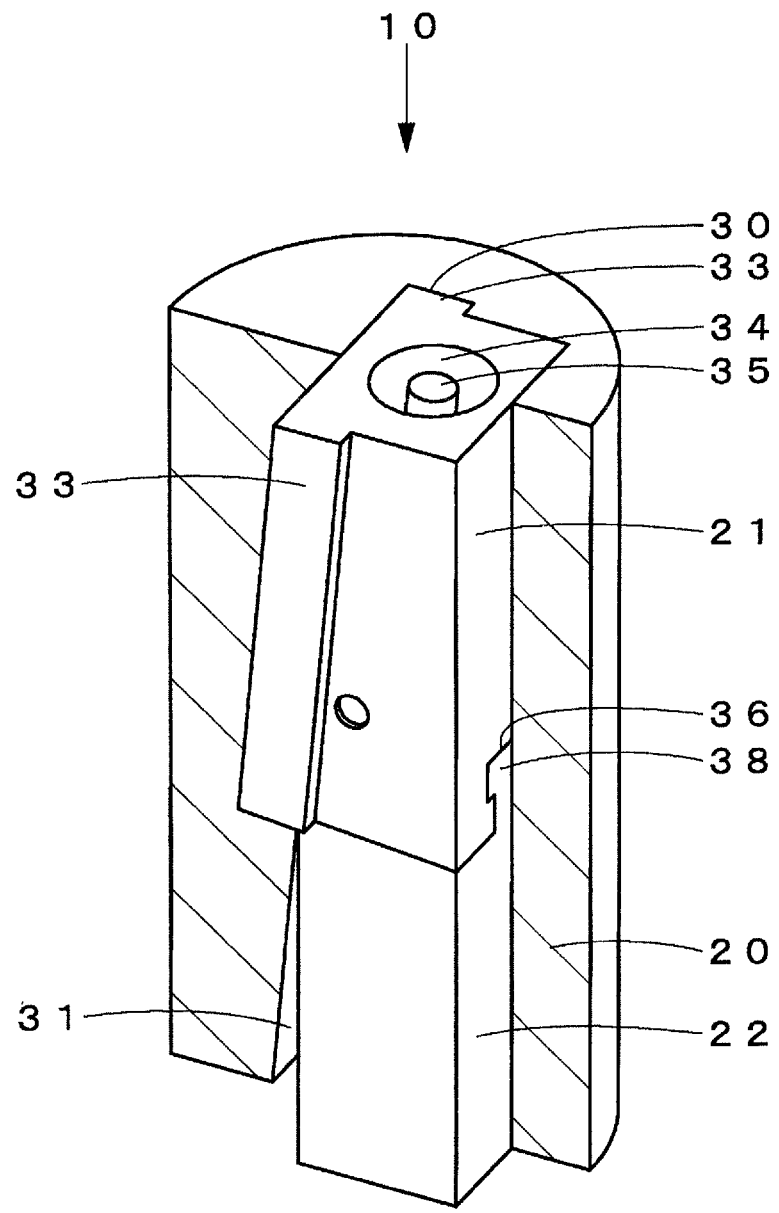
FIG. 4 is a perspective view of an undercut processing mechanism of the molding die in FIG. 1.
Figure 5:
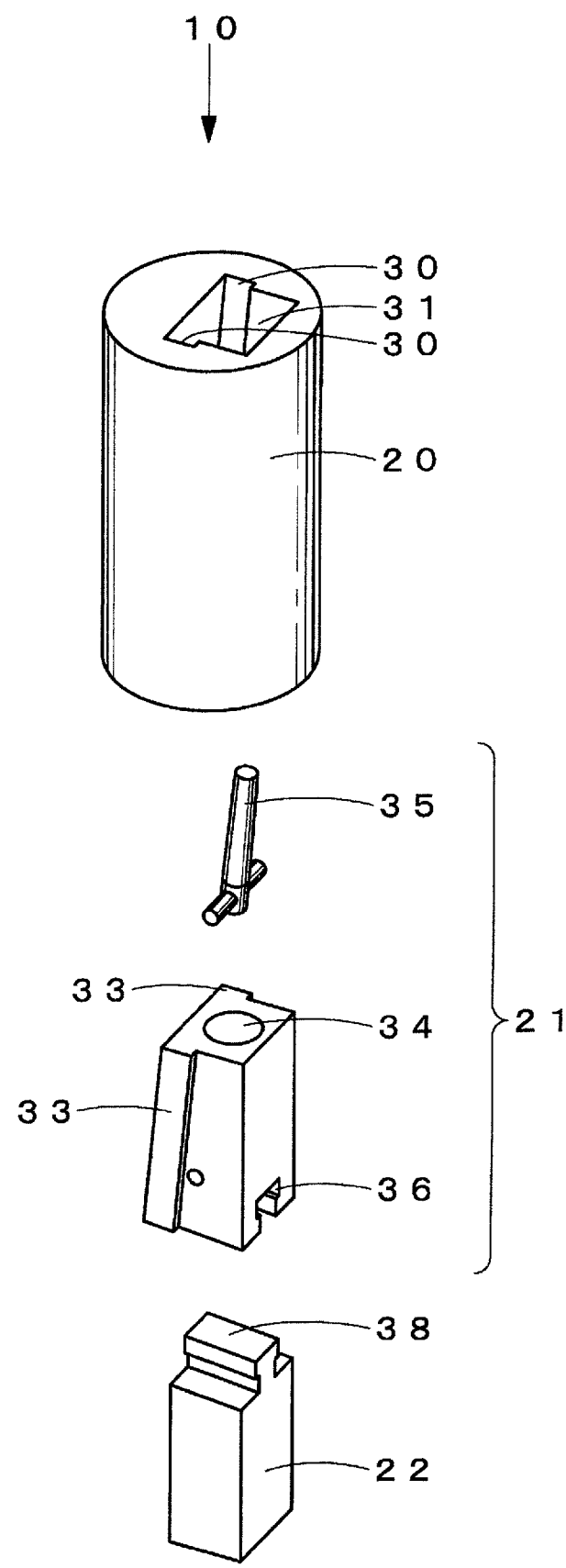
FIG. 5 is an exploded perspective view of the undercut processing mechanism of the molding die in FIG. 1.

FIG. 1 is a cross-sectional view of a molding die 1 according to a first embodiment of the present invention; FIG. 2 is a cross-sectional view of the molding die 1 in FIG. 1 after the molding die 1 is opened; FIG. 3 is a cross-sectional view of the molding die 1 in FIG. 1 after an operation of protruding a molded product P; FIG. 4 is a perspective view of an undercut processing mechanism 10 of the molding die 1 in FIG. 1; and FIG. 5 is an exploded perspective view of the undercut processing mechanism 10 of the molding die 1 in FIG. 1. In FIG. 4, only a holder 20 is shown in the cross-section.

The molding die 1 according to the first embodiment of the present invention includes a stationary mold 100 into which a molding material is injected to form the outer surface side of the molded product P (see FIG. 1), and a movable mold 101 that forms the inner surface side of the molded product P, including an undercut portion P1, as in the configuration of a known injection molding die, but is different from the known injection molding die in including an undercut processing mechanism 10. For the sake of convenience, a description will be given on the assumption that the stationary mold 100 side in FIG. 1 is an upper side and the movable mold 101 side in FIG. 1 is a lower side.

Similar to the known injection molding die, in the molding die 1 of the present embodiment, the stationary mold 100 includes a stationary side attaching plate 103, a stationary side molding plate 104, a locating ring 105 and a sprue bushing 106. The movable mold 101 includes a movable side attaching plate 107, a movable side molding plate 108, a spacer block 109, two ejector base plates 110, an ejector pin 111, a return pin 112, a spring 113 and an ejector rod 114. After forming and opening of the molding die 1, an operation of protruding the molded product P is performed with the ejector pin 111 by moving the ejector base plates 110 relative to the movable side molding plate 108 in a demolding direction in which the molded product P is demolded (the upward direction in FIG. 1). The above components are the same as those of the known injection molding die, and thus the description thereof is omitted.

In the molding die 1 of the present embodiment, the undercut processing mechanism 10 that allows the undercut portion P1 to be demolded is incorporated into the movable mold 101. A holder ejector pin 12 that performs an operation of protruding a holder 20 of the undercut processing mechanism 10 is erected on the ejector base plates 110 in addition to the ejector pin 111.

The undercut processing mechanism 10 allows the undercut portion P1 to be demolded from the molding die 1 in demolding (protruding) the molded product P. In the present embodiment, the undercut portion P1 is a cylindrical boss that projects from the inner surface side of the molded product P in a direction intersecting the demolding direction of the molded product P (the upward direction in FIG. 1). The undercut portion that can be formed and demolded in the undercut processing mechanism, the molding die and the molded product according to the present invention is not limited to the cylindrical boss as will be described later. The material of the molded product P is not limited to a synthetic resin such as plastics, and may be a metal such as iron, copper and aluminum.

The undercut processing mechanism 10 includes: the cylindrical holder 20 that is reciprocatable in the demolding direction of the molded product P; a sliding piece 21 that is slidably disposed within the holder 20; and a retaining piece 22 that slidably retains the sliding piece 21. The undercut processing mechanism 10 is configured such that, in demolding the molded product P, by the holder 20 moving in the demolding direction of the molded product P, the sliding piece 21 moves in a direction that is different from the demolding direction of the molded product P and in which the undercut portion P1 is enabled to be or can be demolded.

Here, "the direction in which the undercut portion P1 is enabled to be or can be demolded" is a movement direction of the sliding piece 21 in which the sliding piece 21 is detached from the undercut portion P1 without deforming or damaging the undercut portion P1. In the present embodiment, "the direction in which the undercut portion P1 is enabled to be or can be demolded" is a direction that coincides with a central axis O of the cylindrical boss (undercut portion P1) and in which the sliding piece 21 is moved away from the undercut portion P1.

The holder 20 is fixed at a bottom surface thereof to the distal end of the holder ejector pin 12 so as to be reciprocatable in the demolding direction of the molded product P in conjunction with the ejector base plates 110 via the holder ejector pin 12, and is embedded in the movable side molding plate 108 of the movable mold 101. The shape of the holder 20 is not limited to the cylindrical shape and may be, for example, a tubular shape having a cross section with a polygonal outer shape.

The holder 20 is formed and disposed such that the upper surface thereof is flush with the upper surface of the movable side molding plate 108 during clamping of the molding die 1 and is in contact with the inner surface of the molded product P during forming. Accordingly, the holder 20 forms the molded product P during forming, and performs an operation of protruding the molded product P in demolding the molded product P. In addition, the holder 20 is formed and disposed such that no gap occurs between the upper surface of the holder 20 and the upper surface of the movable side molding plate 108 during clamping, in order to prevent molding defect in the molded product P.

A hollow portion 31 of the cylindrical holder 20 is formed so as to be able to accommodate the sliding piece 21 and the retaining piece 22 therein, and has an inclined groove 30 forming a restrictor that restricts the sliding direction of the sliding piece 21 to the direction in which the undercut portion P1 can be demolded. As shown in FIG. 3 and FIG. 4, the hollow portion 31 has a projected shape in a plan view, and also has a cross-sectional area gradually increasing from the upper end toward the lower end.

The inclined groove 30 is provided parallel to the central axis O of the undercut portion P1 such that the inclined groove 30 engages with later-described projections 33 of the sliding piece 21 to restrict the sliding direction of the sliding piece 21 to the direction in which the undercut portion P1 can be demolded.

The sliding piece 21 is slidable within the holder 20 along the inclined groove 30, and has: the projections 33 forming restrictor that slidably engages with the inclined groove 30 to restrict the sliding direction of the sliding piece 21 to the direction in which the undercut portion P1 can be demolded; a hollow portion 34 that forms the undercut portion P1; a pin 35 that is a molding member for forming a hollow portion of the undercut portion P1; and a dovetail groove 36 forming a restrictor that slidably engages with the retaining piece 22 to restrict the sliding direction of the sliding piece 21 to the direction in which the undercut portion P1 can be demolded. As shown in FIG. 3, the sliding piece 21 has a projected shape in a plan view such that the sliding piece 21 is tightly fitted into the hollow portion 31 of the holder 20 during clamping, and also has a cross-sectional area gradually increasing from the upper end toward the lower end.

The sliding piece 21 is also formed such that no gap occurs between the upper surface of the sliding piece 21 and the upper surface of the holder 20 during clamping, that is, when the sliding piece 21 is present at the upper end of the holder 20, in order to prevent molding defect in the molded product P.

The projections 33 are provided at the side surface of the sliding piece 21 so as to be inclined such that the projections 33 can engage with the inclined groove 30 of the holder 20 to restrict the sliding direction of the sliding piece 21 to the direction in which the undercut portion P1 can be demolded.

The hollow portion 34 is a round hole provided in the upper surface of the sliding piece 21. The pin 35 is disposed at a center within the hollow portion 34 and fixed to the sliding piece 21. The shape and the arrangement of the hollow portion 34 and the pin 35 may be determined as appropriate in accordance with the shape of the undercut portion P1. In addition, the pin 35 may be formed so as to be integrated with the hollow portion 34.

The dovetail groove 36 is provided in the bottom surface of the sliding piece 21 so as to slidably engage with a later-described projection 38 of the retaining piece 22. The dovetail groove 36 (the bottom surface of the sliding piece 21) is inclined in a direction perpendicular to the direction in which the undercut portion P1 can be demolded (the central axis O of the undercut portion P1), such that the sliding piece 21 moves in the direction in which the undercut portion P1 can be demolded, in conjunction with the holder 20.

The retaining piece 22 retains the sliding piece 21 such that the sliding piece 21 slides in conjunction with the holder 20, and the bottom surface of the retaining piece 22 is fixed to the movable side molding plate 108. The retaining piece 22 has, on the upper surface thereof, the projection 38 forming a restrictor that restricts the sliding direction of the sliding piece 21 to the direction in which the undercut portion P1 can be demolded. The retaining piece 22 engages with the dovetail groove 36 of the sliding piece 21 by the projection 38.

The retaining piece 22 is disposed such that the retaining piece 22 is adjacently aligned with the sliding piece 21 in the movement direction of the holder 20 and is accommodated within the holder 20 together with the sliding piece 21 during clamping. The sliding piece 21 and the retaining piece 22 do not need to be fully accommodated within the holder 20 during clamping and/or opening, and may partially project from the holder 20. In addition, the retaining piece 22 may be formed so as to be integrated with the movable side molding plate 108.

Similar to the dovetail groove 36 (the bottom surface of the sliding piece 21), the projection 38 (the upper surface of the retaining piece 22) is inclined in a direction perpendicular to the direction in which the undercut portion P1 can be demolded (the central axis O of the undercut portion P1), such that the sliding piece 21 moves in the direction in which the undercut portion P1 can be demolded, in conjunction with the holder 20.

Action of the molding die 1 of the present embodiment will be described. In forming the molded product P, in a state where the molding die 1 is clamped, the molding material is injected from the sprue bushing 106 of the stationary mold 100 and then hardened to form the molded product P (see FIG. 1). During forming, the upper surface of the holder 20 and the upper surface of the sliding piece 21 of the undercut processing mechanism 10 become flush with the upper surface of the movable side molding plate 108 and come into contact with the molded product P (the molding material) to perform forming, and then, the hollow portion 34 and the pin 35 of the sliding piece 21 form the undercut portion P1 of the molded product P.

After the forming of the molded product P, the molding die 1 is opened. During opening of the molding die 1, the entire movable mold 101 moves in the downward direction in FIG. 1, and the molded product P remains at the movable mold 101 side (see FIG. 2). After the molding die 1 is opened, an operation of protruding the molded product P is performed. During the operation of protruding the molded product P, the ejector base plates 110 move in the upward direction in FIG. 1.

In the undercut processing mechanism 10, with the movement of the ejector base plates 110, the holder 20 projects from the upper surface of the movable side molding plate 108 by the holder ejector pin 12 so as to protrude the molded product P in the upward direction in FIG. 1 together with the ejector pin 111. Simultaneously with this, due to action of the inclined groove 30 of the holder 20, the projections 33 and the dovetail groove 36 of the sliding piece 21, and the projection 38 of the retaining piece 22, the sliding piece 21 moves relative to the undercut portion P1 along the central axis O in the lower left direction in FIG. 1 and is detached from the undercut portion P1.

Accordingly, when the operation of protruding the molded product P has been completed, the sliding piece 21 is detached from the undercut portion P1, and a state is obtained in which the molded product P is projected from the movable side molding plate 108 by the ejector pin 111 and the holder 20 (see FIG. 3). After the molded product P is taken out, the molding die 1 is clamped again in order to form the next molded product P.

During clamping, the entire movable mold 101 moves in the upward direction in FIG. 1, and the ejector base plates 110 move in the downward direction in FIG. 1. In the undercut processing mechanism 10, with the movement of the ejector base plates 110, the holder 20 is retracted into the movable side molding plate 108 by the holder ejector pin 12. Simultaneously with this, due to the action of the inclined groove 30 of the holder 20, the projections 33 and the dovetail groove 36 of the sliding piece 21, and the projection 38 of the retaining piece 22, the sliding piece 21 moves along the inclined groove 30 of the holder 20, and the upper surface of the holder 20 and the upper surface of the sliding piece 21 become flush with the upper surface of the movable side molding plate 108. After the clamping has been completed, the molding material is injected and the next molded product P is formed.

As described above, in the molding die 1 and the undercut processing mechanism 10 of the present embodiment, in the configuration in which the sliding piece 21 and the retaining piece 22 are provided within the holder 20, the holder 20 moves in the demolding direction of the molded product P, thereby protruding the molded product P and demolding the undercut portion P1. Thus, the undercut processing mechanism 10 can be made compact and also, allows the undercut portion P1 to be easily demolded.

In the undercut processing mechanism 10 of the present embodiment, the sliding piece 21 and the retaining piece 22 are provided within the holder 20 so as to be adjacently aligned with each other in the movement direction of the holder 20, and thus a space needed for installing the sliding piece 21 and the retaining piece 22 can be small. Thus, the undercut processing mechanism 10 can be easily applied to other molding dies as well as the molding die 1 of the present embodiment.

In the molding die 1 of the present embodiment, the ejector pin 111 is used for protruding the molded product P. However, it is possible to protrude the molded product P only with the holder 20 depending on the conditions such as the weight of the undercut portion P1 and a position, in the molded product P, at which the undercut portion P1 is formed. Accordingly, it is possible to achieve further size reduction and cost reduction of the molding die 1.

Figure 6A:
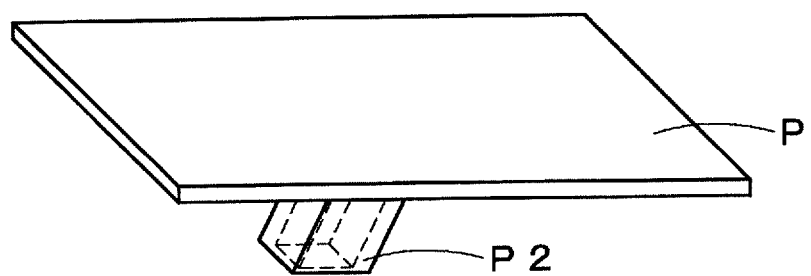
FIG. 6A is a perspective view showing an example of a molded product that can be formed with the undercut processing mechanism and the molding die according to the present invention.
Figure 6B:
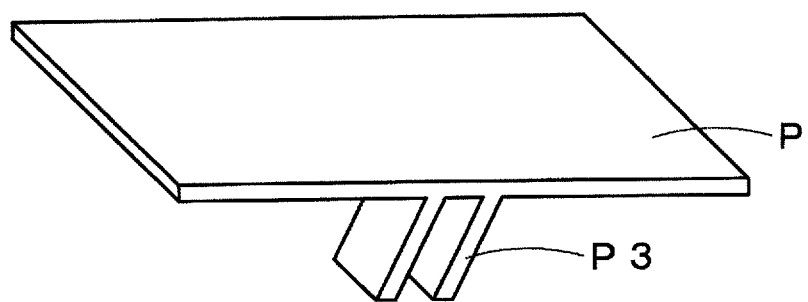
FIG. 6B is a perspective view showing another example of a molded product that can be formed with the undercut processing mechanism and the molding die according to the present invention.

The molded product that can be formed with the molding die according to the present embodiment is not limited to a molded product having a cylindrical boss as an undercut portion. FIG. 6A and FIG. 6B are each a perspective view showing an example of the molded product that can be formed with the undercut processing mechanism and the molding die according to the present invention. The undercut processing mechanism of the molding die according to the present invention can be suitably used particularly for forming and demolding an undercut portion that has a hollow portion or a space portion to be formed by a molding member such as the pin 35 and that has a plurality of projections aligned in a direction parallel to a surface from which the undercut portion projects project in a vertical cross-sectional view, as in the undercut portions P1, P2, and P3 shown in the first embodiment and FIGS. 6A and 6B. It is impossible to perform such a demolding with a conventional loose core, which moves in a direction perpendicular to the demolding direction of the molded product P.

Figure 7:
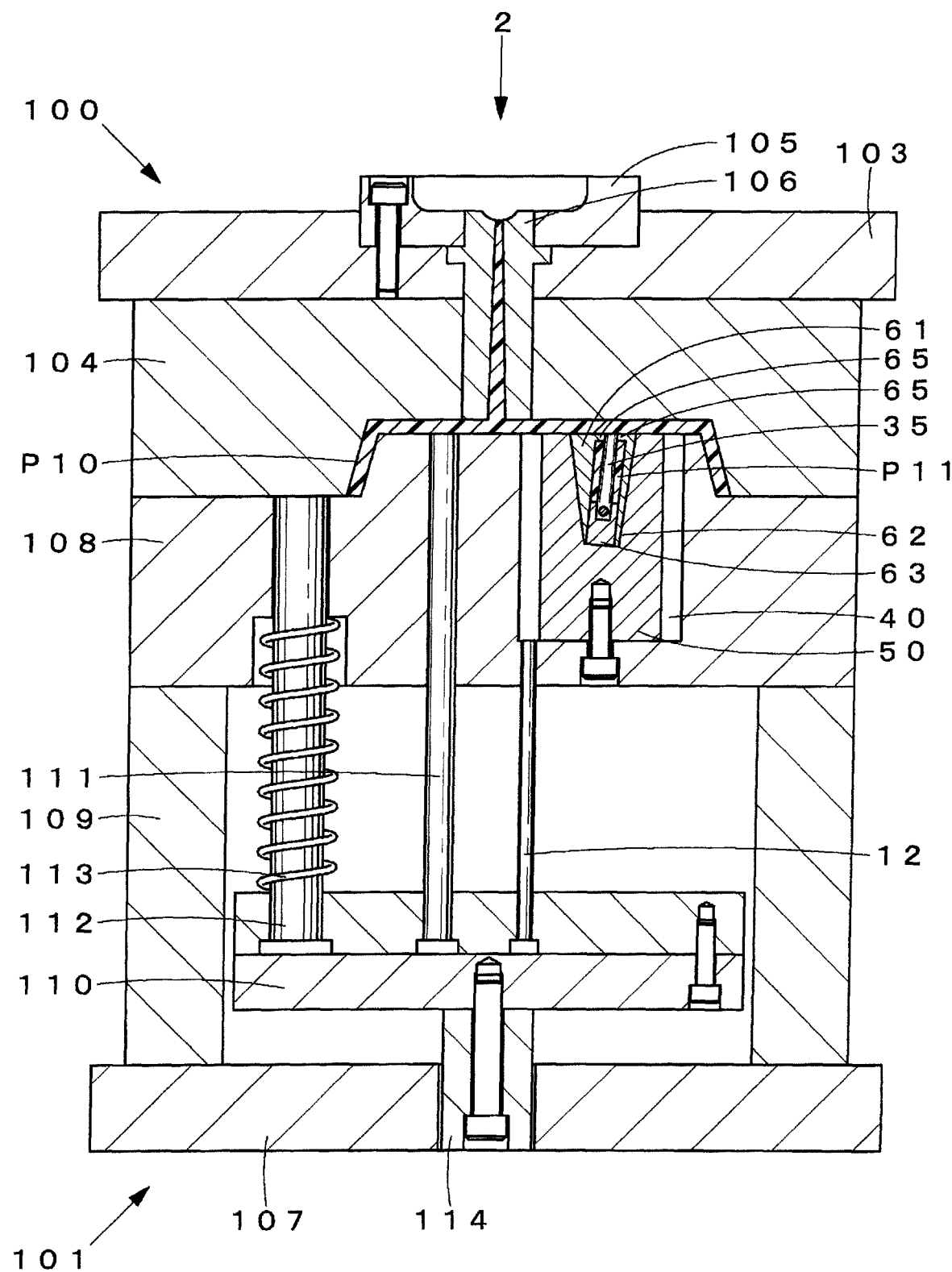
FIG. 7 is a cross-sectional view of a molding die according to a second embodiment of the present invention during clamping.
Figure 8:
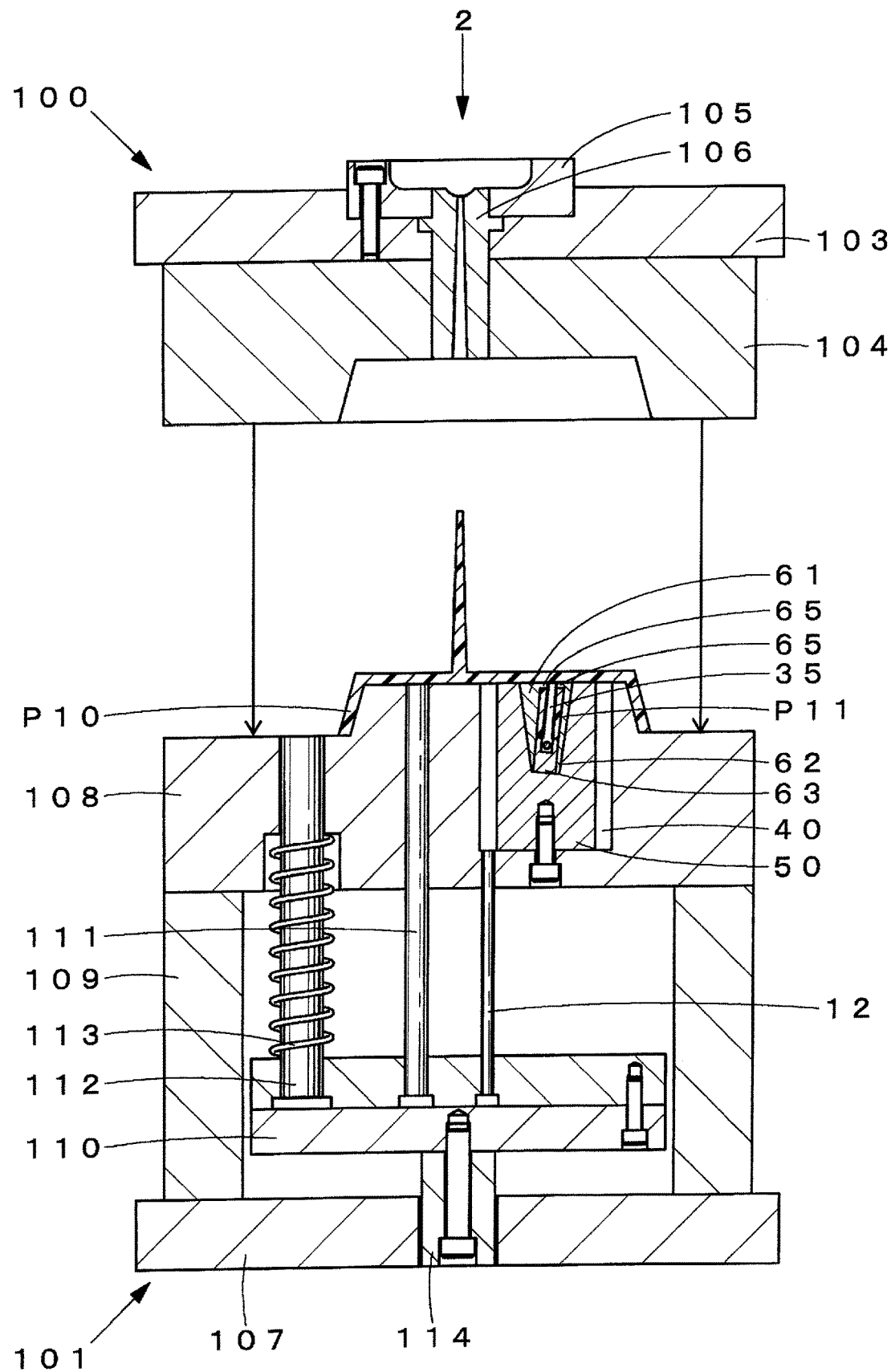
FIG. 8 is a cross-sectional view of the molding die in FIG. 7 after the molding die is opened.
Figure 9:
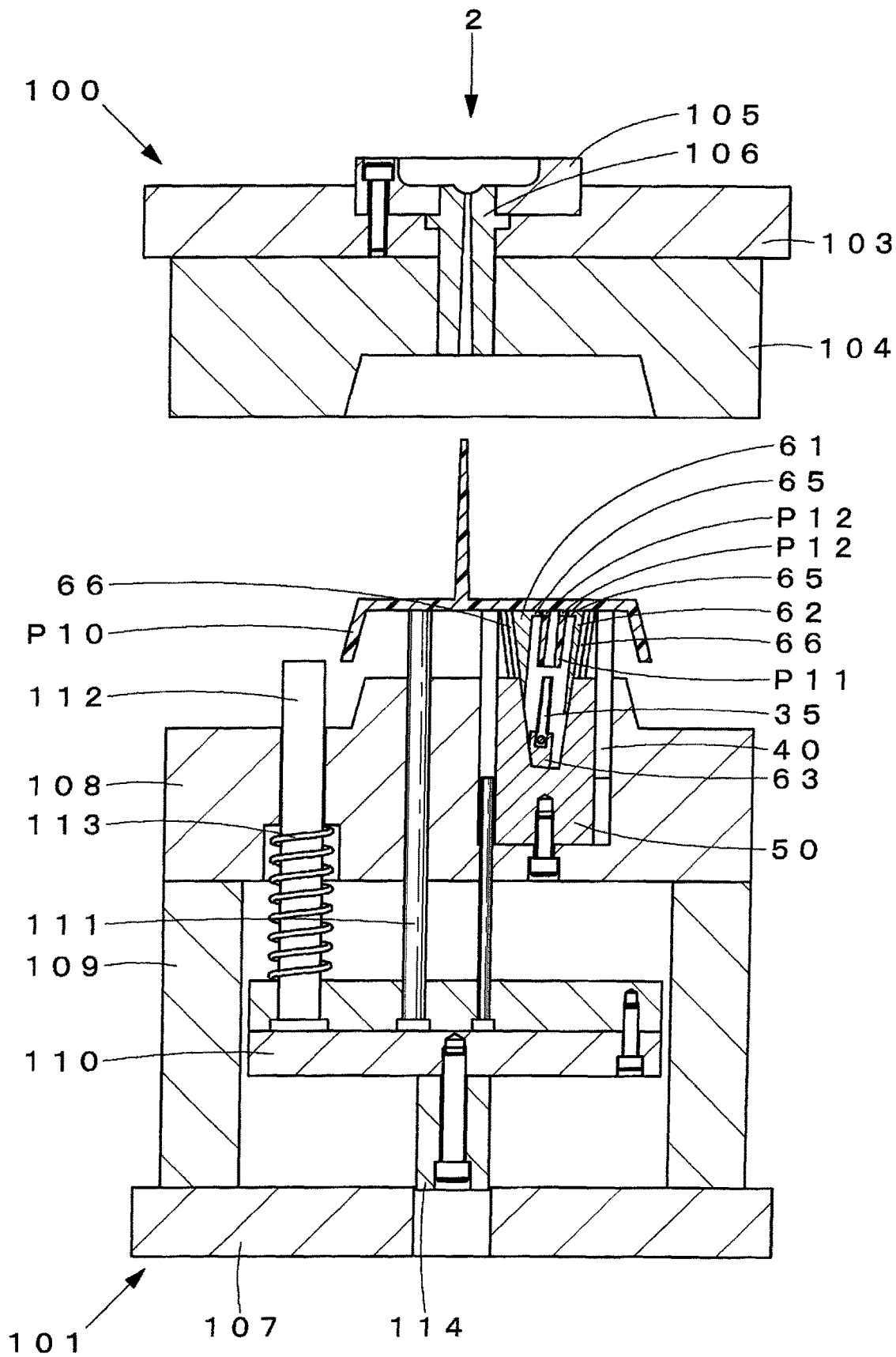
FIG. 9 is a cross-sectional view of the molding die in FIG. 7 after an operation of protruding a molded product.
Figure 10:
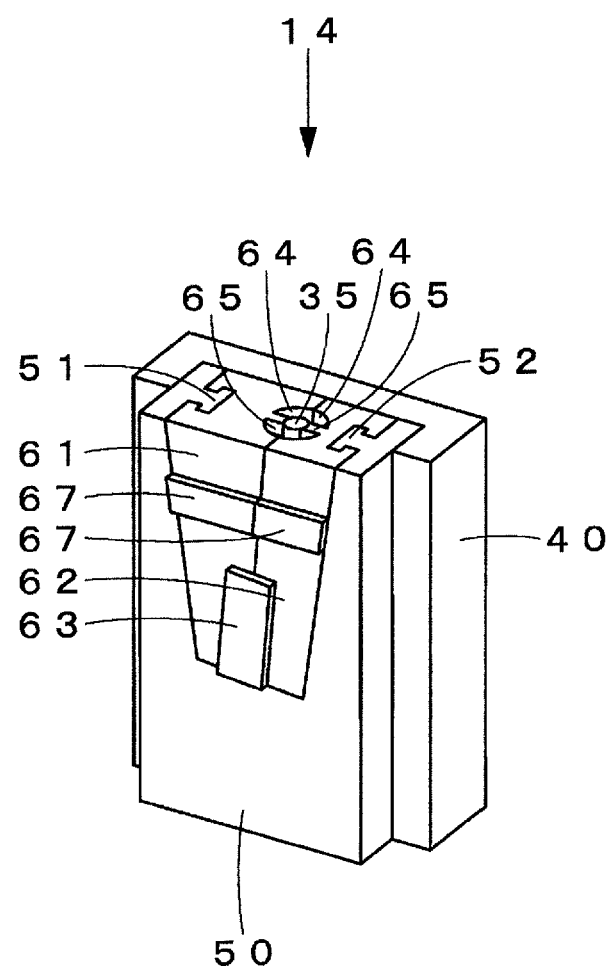
FIG. 10 is a perspective view of an undercut processing mechanism of the molding die in FIG. 7.
Figure 11:
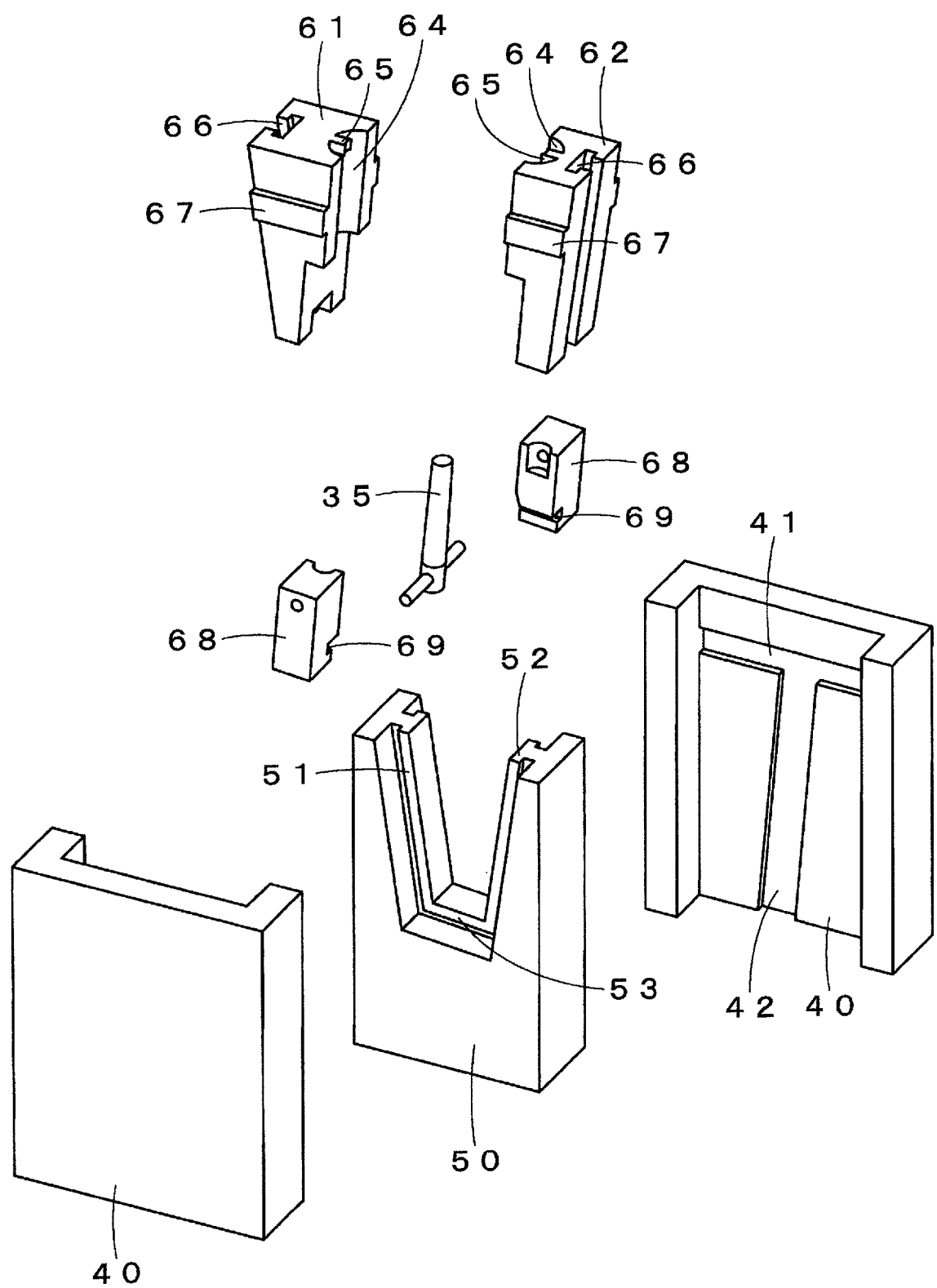
FIG. 11 is an exploded perspective view of the undercut processing mechanism of the molding die in FIG. 7.
Figure 12A:
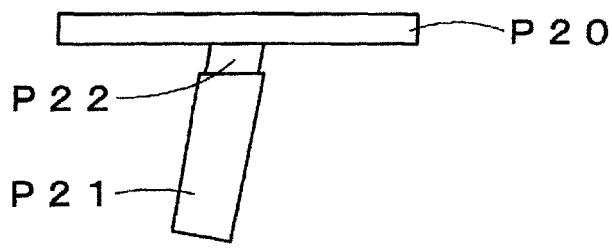
FIGS. 12A-12D are a front view, a side view, a bottom view and a perspective view of a first example of the molded product that can be formed with the undercut processing mechanism and the molding die, respectively.
Figure 12B:
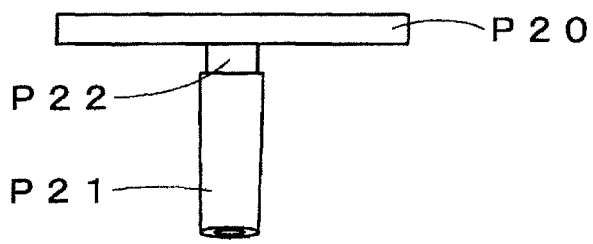
Figure 12C:
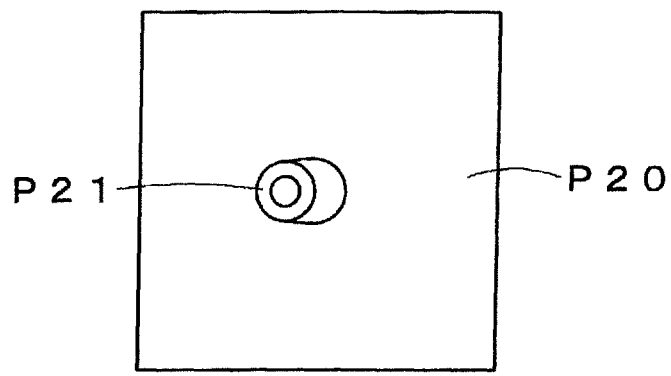
Figure 12D:
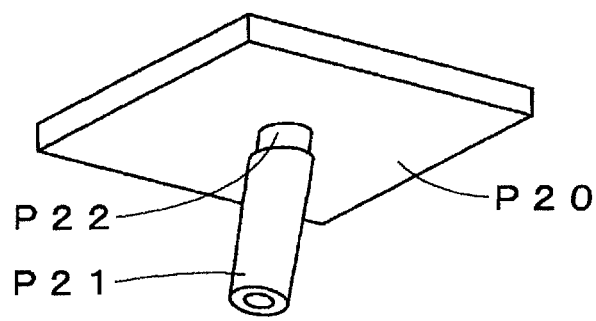
Figure 13A:
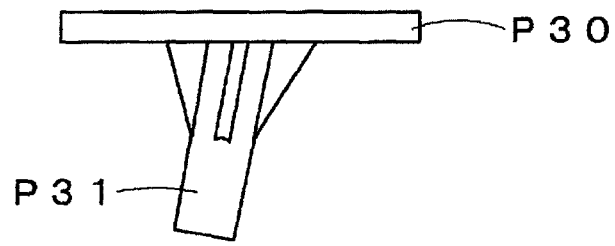
FIGS. 13A-13D are a front view, a side view, a bottom view and a perspective view of a second example of the molded product that can be formed with the undercut processing mechanism and the molding die, respectively.
Figure 13B:
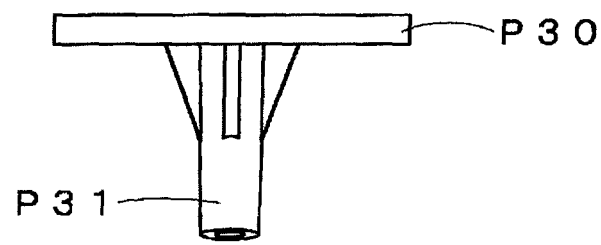
Figure 13C:
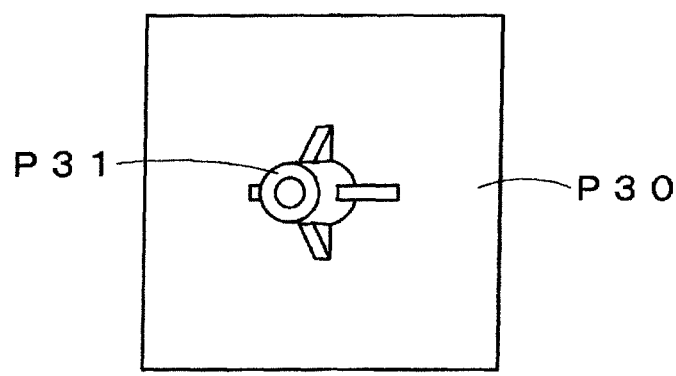
Figure 13D:
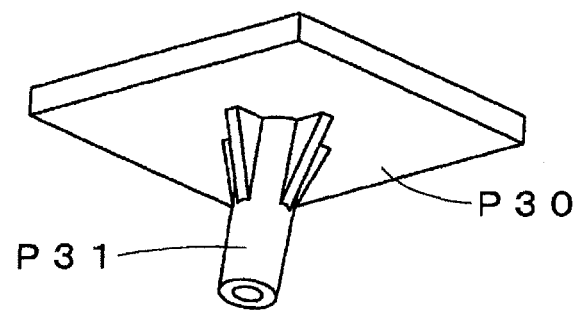
Figure 14A:
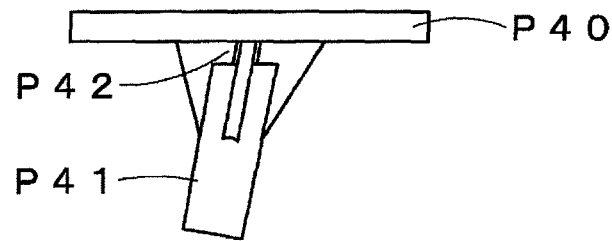
FIGS. 14A-14D are a front view, a side view, a bottom view and a perspective view of a third example of the molded product that can be formed with the undercut processing mechanism and the molding die, respectively.
Figure 14B:
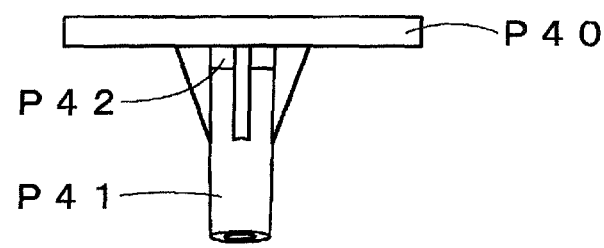
Figure 14C:
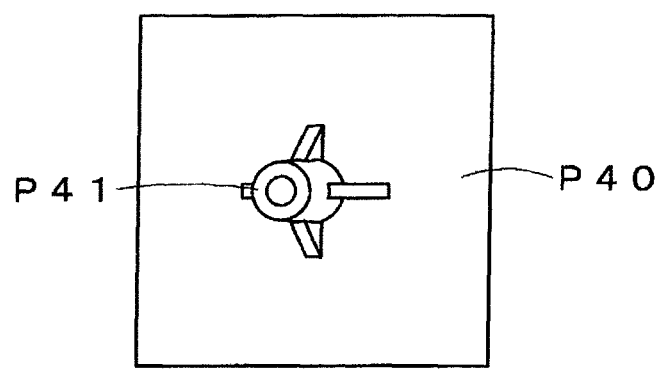
Figure 14D:
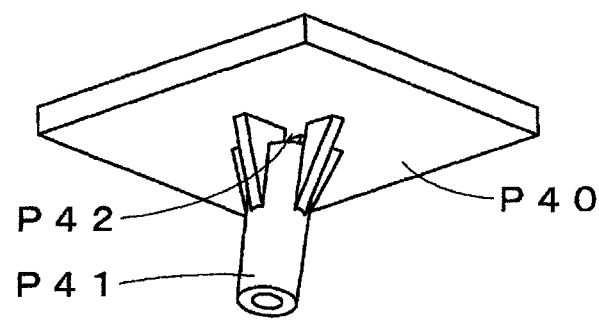
Figure 15A:
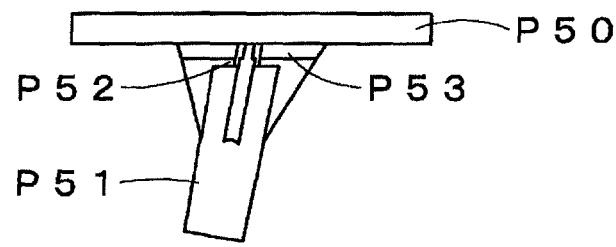
FIGS. 15A-15D are a front view, a side view, a bottom view and a perspective view of a fourth example of the molded product that can be formed with the undercut processing mechanism and the molding die, respectively.
Figure 15B:
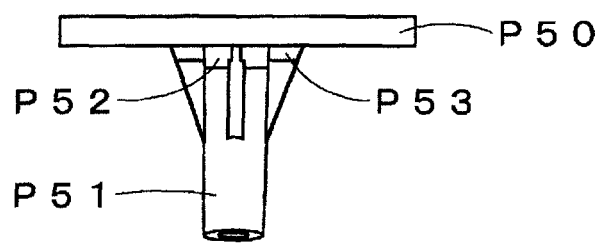
Figure 15C:
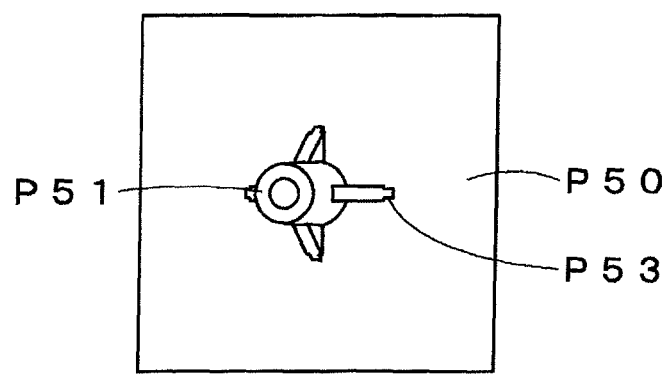
Figure 15D:
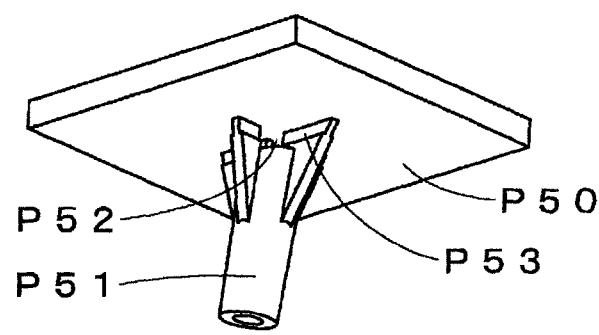
Figure 16A:
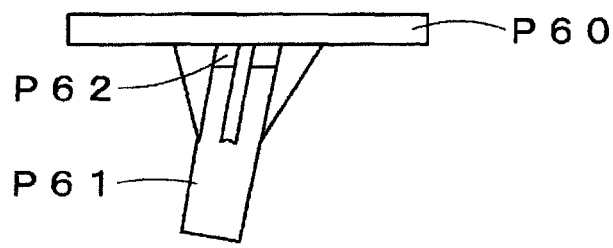
FIGS. 16A-16D are a front view, a side view, a bottom view and a perspective view of a fifth example of the molded product that can be formed with the undercut processing mechanism and the molding die, respectively.
Figure 16B:
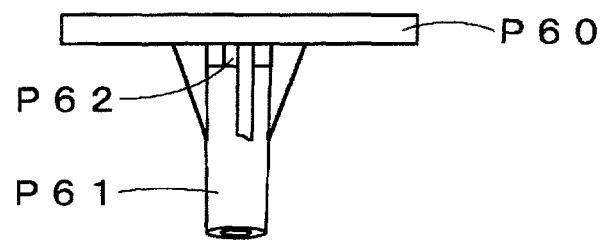
Figure 16C:
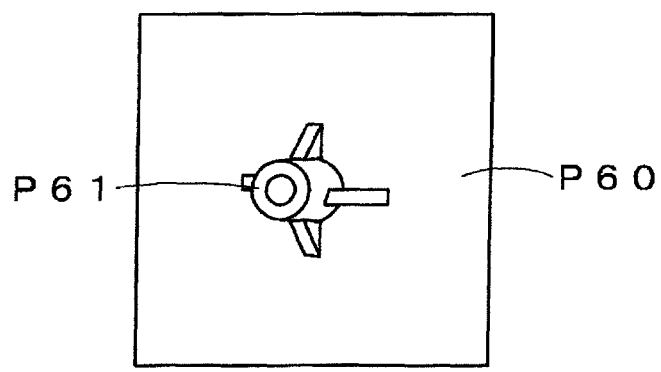
Figure 16D:
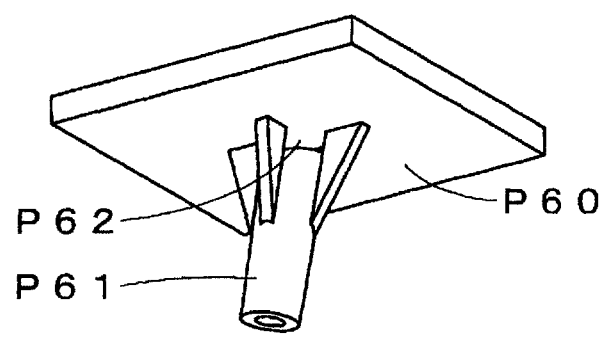

FIG. 7 is a cross-sectional view of a molding die 2 according to a second embodiment of the present invention during clamping; FIG. 8 is a cross-sectional view of the molding die 2 in FIG. 7 after the molding die 2 is opened; FIG. 9 is a cross-sectional view of the molding die 2 in FIG. 7 after an operation of protruding a molded product P10; FIG. 10 is a perspective view of an undercut processing mechanism 10 of the molding die 2 in FIG. 7; and FIG. 11 is an exploded perspective view of the undercut processing mechanism 10 of the molding die 2 in FIG. 7.

The same components as in the molding die 1 of the first embodiment shown in FIG. 1 to FIG. 5 are denoted by the same reference numerals, and the description thereof is omitted. The molding die 2 of the second embodiment has the same basic configuration as the molding die 1 of the first embodiment, but is different from the molding die 1 of the first embodiment in the configuration and the shape of an undercut processing mechanism 14 in accordance with the shape of the molded product P10 to be formed.

The molded product P10 has an undercut portion P11 that is a cylindrical boss projecting in a direction intersecting a demolding direction, and a hole P12, that has a rectangular cross-sectional shape, is provided at two locations in the base of the undercut portion P11. The hole P12 forms another undercut portion that can be demolded in a direction different from that of the undercut portion P11. The undercut processing mechanism 14 of the molding die 2 of the present embodiment has a sliding piece that is formed as a split type such that the undercut portion P11 having such holes P12 can be formed.

Similar to the undercut processing mechanism 10 of the molding die 1 of the first embodiment, the undercut processing mechanism 14 of the molding die 2 of the second embodiment includes: a holder 40 that is slidable relative to the movable side molding plate 108; a retaining piece 50 that is fixed to the movable side molding plate 108; and a sliding piece slidably disposed within the holder 40, which sliding piece includes split type sliders composed of a first sliders 61, a second slider 62 and a third slider 63.

The holder 40 is configured so as to form a square tube by two half-split members having substantially U cross-sectional shapes symmetrical to each other such that the sliding piece can be incorporated into the holder 40. The holder 40 has an inner surface provided with: a horizontal groove 41 that guides the first slider 61 and the second slider 62; and an inclined groove 42 that guides the third slider 63. The holder 40, which is composed of two members, needs to be configured such that the two members integrally move during movement of the ejector base plates 110. The holder 40 may be composed of three or more members.

The horizontal groove 41 is provided parallel to a boring direction in which the holes P12 are bored, such that the first slider 61 and the second slider 62 move so as to be able to demold the undercut portion P11 and the holes P12. That is, in the case where the boring direction of the holes P12 is not horizontal, the horizontal groove 41 is provided parallel to the boring direction of the holes P12 (the direction in which the holes P12 can be demolded), not horizontally.

The inclined groove 42 is provided parallel to a projection direction in which the undercut portion P11 projects, such that the third slider 63 moves in the direction in which the pin 35 of the third slider 63 is pulled out from the hollow portion of the undercut portion P11, during upward movement of the ejector base plates 110 (the holder 40). The inclined groove 42 corresponds to the inclined groove 30 of the holder 20 in the molding die 1 of the first embodiment.

The retaining piece 50 is a block member provided with a cut having a substantially trapezoidal shape. A first projection 51, a second projection 52 and a third projection 53 that slidably engage with and retain the first slider 61, the second slider 62, and the third slider 63, respectively, are formed on an end surface of the retaining piece 50 on which the cut is provided.

The first projection 51, the second projection 52 and the third projection 53 are inclined relative to the horizontal direction (the right-left direction in FIG. 7) and the vertical direction (the up-down direction in FIG. 7). The inclination angles of the first projection 51 and the second projection 52 are determined in accordance with a stroke amount of the ejector base plates 110 such that the first slider 61 and the second slider 62 move to a position where the undercut portion P11 can be demolded, during upward movement of the ejector base plates 110 (the holder 40). The inclination angle of the third projection 53 is determined such that the third slider 63 moves during upward movement of the ejector base plates 110 (the holder 40) until the pin 35 of the third slider 63 is pulled out from the hollow portion of the undercut portion P11. The third projection 53 corresponds to the projection 38 of the retaining piece 22 in the molding die 1 of the first embodiment.

The sliding piece is composed of the first slider 61 and the second slider 62, both of which form the outer surface of the undercut portion P11, and the third slider 63 that forms the hollow portion of the undercut portion P11.

Each of the first slider 61 and the second slider 62 has, on a molding surface 64 that is in contact with the undercut portion P11 during forming, a projection 65 for forming the hole P12 of the undercut portion P11. In the undercut processing mechanism 14 of the molding die 2 of the present embodiment, the sliding piece is formed as a split type such that the projections 65 are pulled out from the holes P12 during upward movement of the ejector base plates 110 (the holder 40).

The first slider 61 has a dovetail groove 66 therein, that engages with the first projection 51 of the retaining piece 50, and a projection 67 that is fitted into the horizontal groove 41 of the holder 40. The second slider 62 has a dovetail groove 66 therein, that engages with the second projection 52 of the retaining piece 50, and a projection 67 that is fitted into the horizontal groove 41 of the holder 40.

The first slider 61 and the second slider 62 are engaged with the first projection 51 and the second projection 52 of the retaining piece 50, respectively, such that the molding surfaces 64 thereof oppose each other. Each of the first slider 61 and the second slider 62 slides along the respective first projection 51 or second projection 52 and the horizontal groove 41 of the holder 40 in conjunction with the holder 40 during movement of the ejector base plates 110.

The third slider 63 includes the pin 35, that forms the hollow portion of the undercut portion P11, and a pair of sliding members 68 that hold the pin 35 therebetween and that slidably engage with the third projection 53 of the retaining piece 50. In the third slider 63, dovetail grooves 69 are provided in the sliding members 68 such that the pair of sliding members 68 are slidably engaged with the third projection 53 of the retaining piece 50 while holding the pin 35 therebetween. Each sliding member 68 is formed in a shape that allows the sliding member 68 to be slidably fitted into the inclined groove 42 of the holder 40.

Action of the molding die 2 of the present embodiment will be described. Regarding the same parts as the action of the molding die 1 of the first embodiment, the description thereof is omitted. In forming the molded product P10, the upper surface of the holder 40 of the undercut processing mechanism 14 and the upper surfaces of the first slider 61 and the second slider 62 become flush with the upper surface of the movable side molding plate 108 and come into contact with the molded product P10 (the molding material) to perform forming, and the molding surfaces 64 of the first slider 61 and the second slider 62 and the pin 35 of the third slider 63 form the undercut portion P11 of the molded product P10 (see FIG. 7). After the molded product P10 is formed, the molding die 1 is opened (see FIG. 8).

After the molding die 2 is opened, an operation of protruding the molded product P10 is performed. In the undercut processing mechanism 14, with movement of the ejector base plates 110, the holder 40 projects from the upper surface of the movable side molding plate 108 by the holder ejector pin 12 to protrude the molded product P in the upward direction in FIG. 8 together with the ejector pin 111. Simultaneously with this, the first slider 61 slides along the horizontal groove 41 of the holder 40 and the first projection 51 of the retaining piece 50, the second slider 62 slides along the horizontal groove 41 of the holder 40 and the second projection 52 of the retaining piece 50, and the third sliders 63 slides along the inclined groove 42 of the holder 40 and the third projection 53 of the retaining piece 50.

Accordingly, when the operation of protruding the molded product P10 has been completed, the first slider 61, the second slider 62 and the third slider 63 are detached from the undercut portion P11 and the holes P12, and a state is obtained in which the molded product P10 is projected from the movable side molding plate 108 by the ejector pin 111 and the holder 40 and in which the molded product P10 can be taken out (see FIG. 9). After the molded product P10 is taken out, the molding die 2 is clamped again in order to form the next molded product P10.

During clamping, with downward movement of the ejector base plates 110, the holder 40 is retracted into the movable side molding plate 108 by the holder ejector pin 12. Simultaneously with this, due to action of the horizontal groove 41 and the inclined groove 42 of the holder 40, the first to third projections 51-53 of the retaining piece 50, and the dovetail grooves 66 and 69 and the projection 67 of the first to third sliders 61-63 are retracted into the movable side molding plate 108, and the upper surface of the holder 40 and the upper surfaces of the first slider 61 and the second slider 62 become flush with the upper surface of the movable side molding plate 108. After the clamping has been completed, the molding material is injected and the next molded product P10 is formed.

In the undercut processing mechanism 14 of the molding die 2 of the present embodiment, the sliding piece is formed as a split type and the respective sliders is configured such that the respective sliders are movable in different directions from each other. By so doing, demolding of a molded product having, in an undercut portion thereof, another undercut portion that can be demolded in a direction different from that of the undercut portion, or the holes P12 of the undercut portion P11, can also be achieved only with a protruding operation by the holder.

The molded product that can be formed with the molding die according to the present invention is not limited to the molded product that is shown in the present embodiment and that has a shape with the two holes P12 provided in the undercut portion P11 so as to be aligned linearly. For example, in the case where only one hole P12 is present in the undercut portion P11 of the molded product P10 and at the first slider 61 side, the second slider 62 may be fixed to the retaining piece 50 or formed so as to be integrated with the retaining piece 50.

In the case where there are three or more holes P12 bored in different directions, sliding pieces respectively corresponding to the holes P12 bored in different directions may be provided in addition to the sliding piece (third slider 63) having the pin 35 for forming the hollow portion of the undercut portion P11. In the case where there are a plurality of holes P12 bored in the same direction, one sliding piece can correspond to the plurality of holes P12. In addition, in the case where the undercut portion P11 has no hollow portion, the sliding piece (third slider 63) having the pin 35 may be fixed to the retaining piece 50 or formed so as to be integrated with the retaining piece 50.

FIGS. 12A-12D to FIGS. 16A-16D are each a diagram showing an example of the molded product that can be formed with the undercut processing mechanism and the molding die according to the present embodiment. FIGS. 12A, 13A, 14A, 15A and 16A are front views; FIGS. 12B, 13B, 14B, 15B and 16B are side views; FIGS. 12C, 13C, 14C, 15C and 16C are bottom views; and FIGS. 12D, 13D, 14D, 15D and 16D are perspective views. The undercut processing mechanism of the molding die according to the present embodiment can also form molded products P20, P40, P50 and P60 having, at undercut portions P21, P41, P51 and P61 thereof, other undercut portions P22, P42, P52, P53 and P62 as shown in FIGS. 12A-12D and FIGS. 14A-14D to FIGS. 16A-16D, merely with a protruding operation by the holder. A molded product P30 having an undercut portion P31 shown in FIGS. 13A-13D can also be formed with an undercut processing mechanism having one sliding piece, or the undercut processing mechanism 10 of the molding die 1 of the first embodiment.

Figure 17:
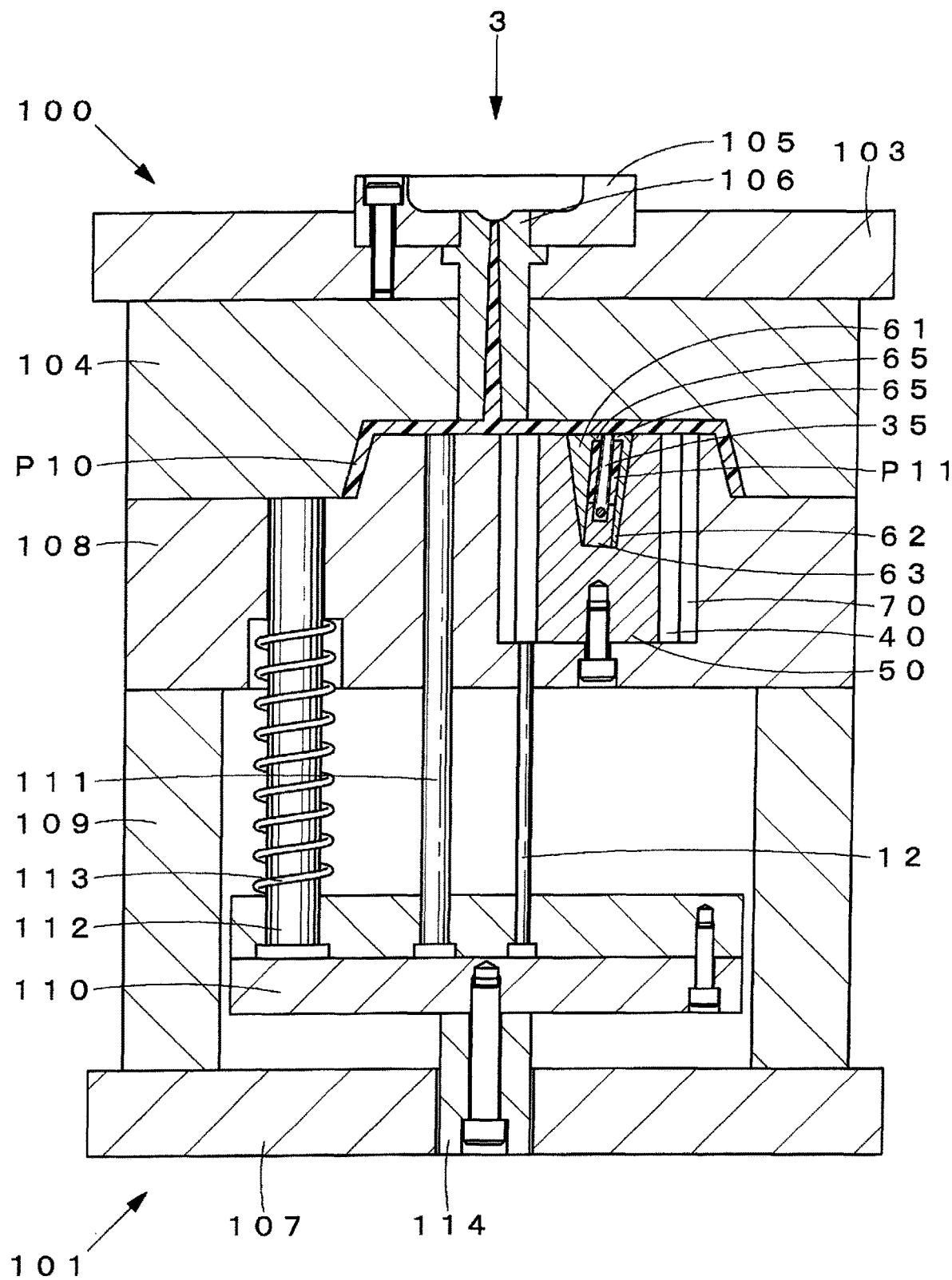
FIG. 17 is a cross-sectional view of a molding die according to a third embodiment of the present invention during clamping.
Figure 18:
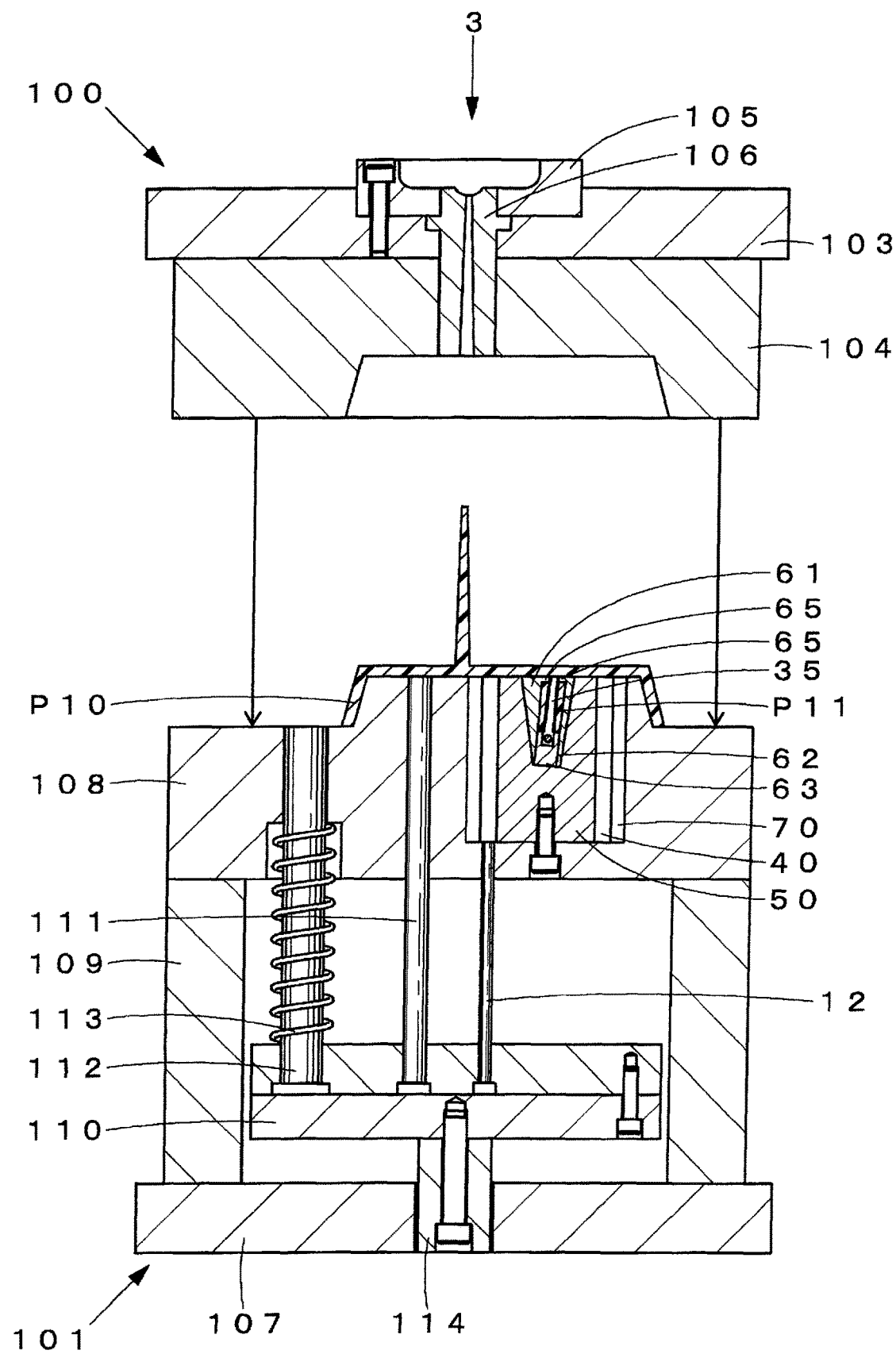
FIG. 18 is a cross-sectional view of the molding die in FIG. 17 after the molding die is opened.
Figure 19:
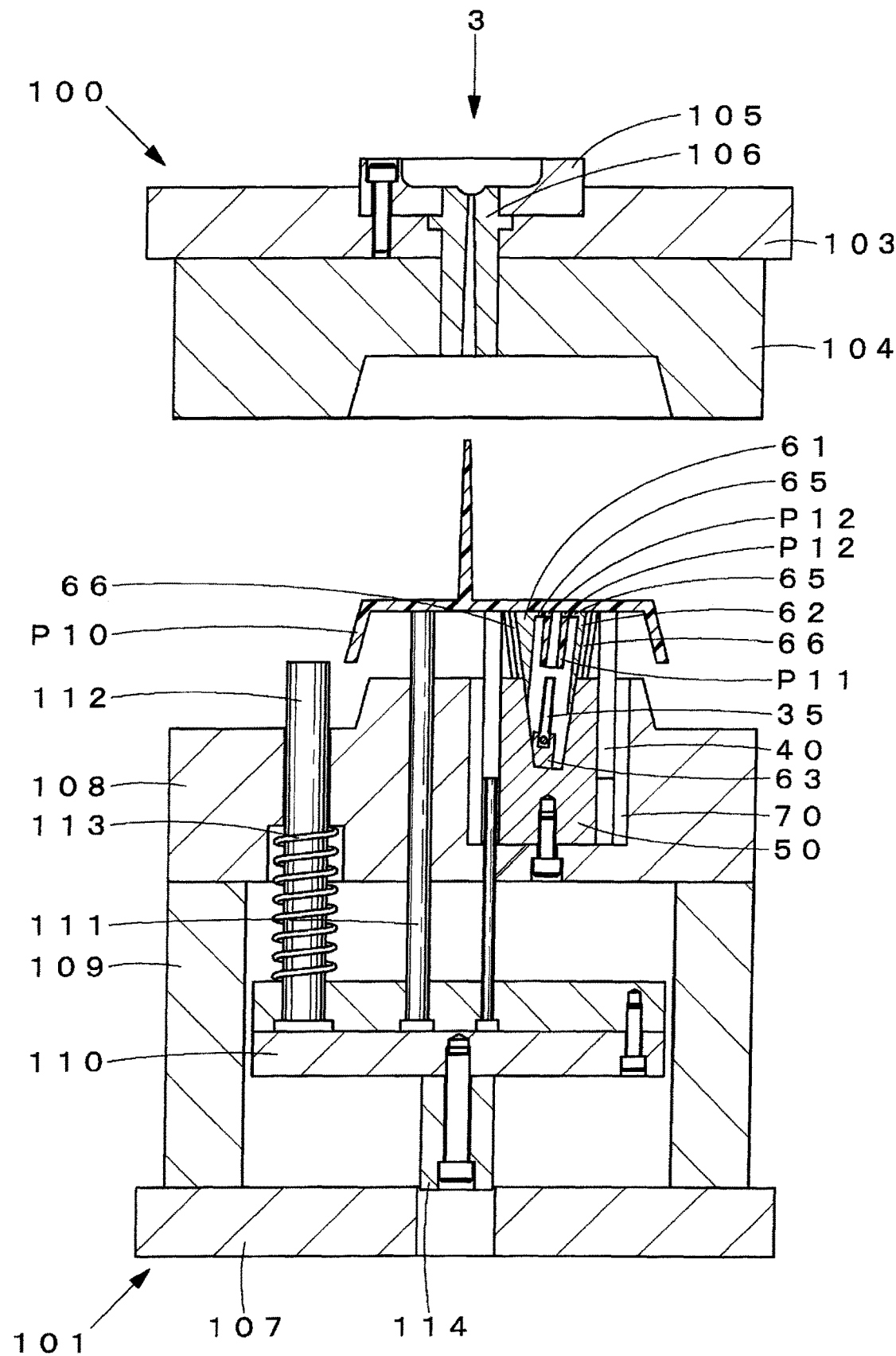
FIG. 19 is a cross-sectional view of the molding die in FIG. 17 after an operation of protruding a molded product.
Figure 20:
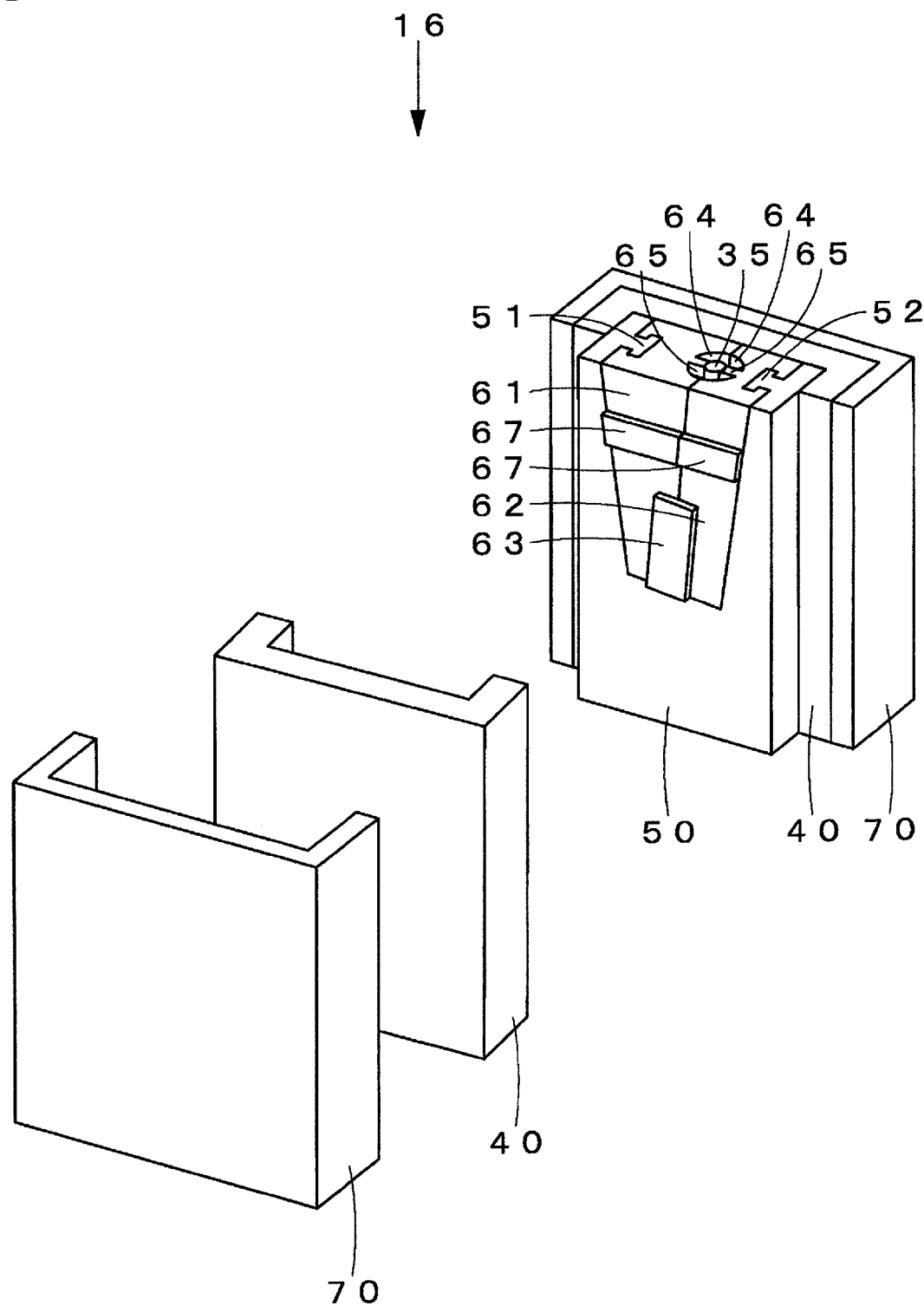
FIG. 20 is a partial exploded perspective view of an undercut processing mechanism of the molding die in FIG. 17.

FIG. 17 is a cross-sectional view of a molding die 3 according to a third embodiment of the present invention during clamping; FIG. 18 is a cross-sectional view of the molding die 3 in FIG. 17 after the molding die 3 is opened; FIG. 19 is a cross-sectional view of the molding die 3 in FIG. 17 after an operation of protruding a molded product P10; and FIG. 20 is a partial exploded perspective view of an undercut processing mechanism 16 of the molding die 3 in FIG. 17.

The same components as in the molding die 2 of the second embodiment shown in FIG. 7 to FIG. 11 are denoted by the same reference numerals, and the description thereof is omitted. The molding die 3 of the third embodiment has the same basic configuration as the molding die 2 of the second embodiment, but also includes a fixed holder 70 outside the holder 40. The fixed holder 70 is fixed to the movable side molding plate 108 so as to surround the holder 40. Similar to the holder 40, the fixed holder 70 is split into two sections in consideration of assemblability, but may be formed as one member or may be composed of three or more members.

In the present embodiment, the holder 40 slides at the outer peripheral surface thereof relative to the fixed holder 70 and does not slide relative to the movable side molding plate 108 of the molding die 3. Thus, wear or damage of the movable side molding plate 108 due to sliding can be avoided.

Figure 21:
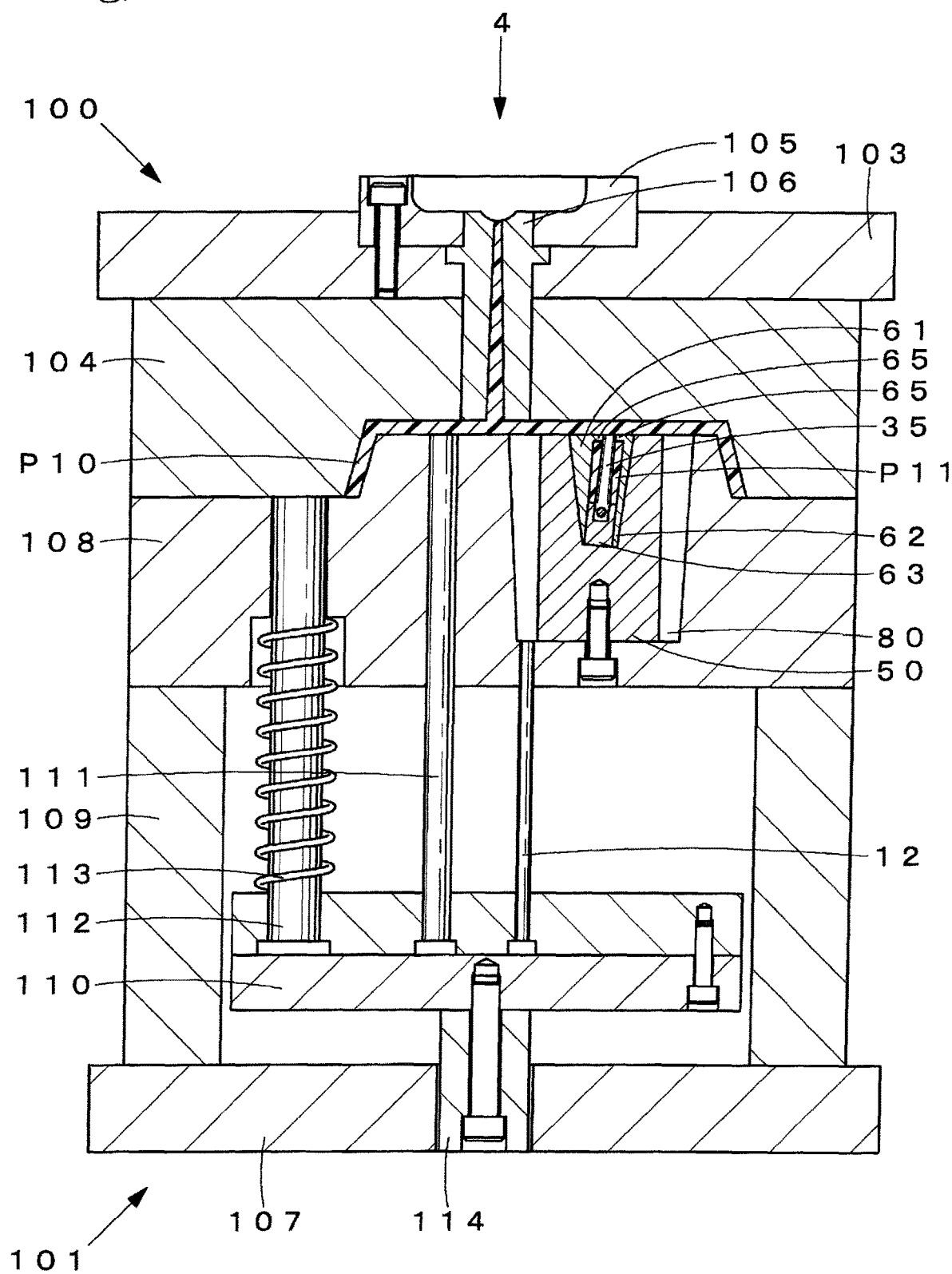
FIG. 21 is a cross-sectional view of a molding die according to a fourth embodiment of the present invention during clamping.
Figure 22:
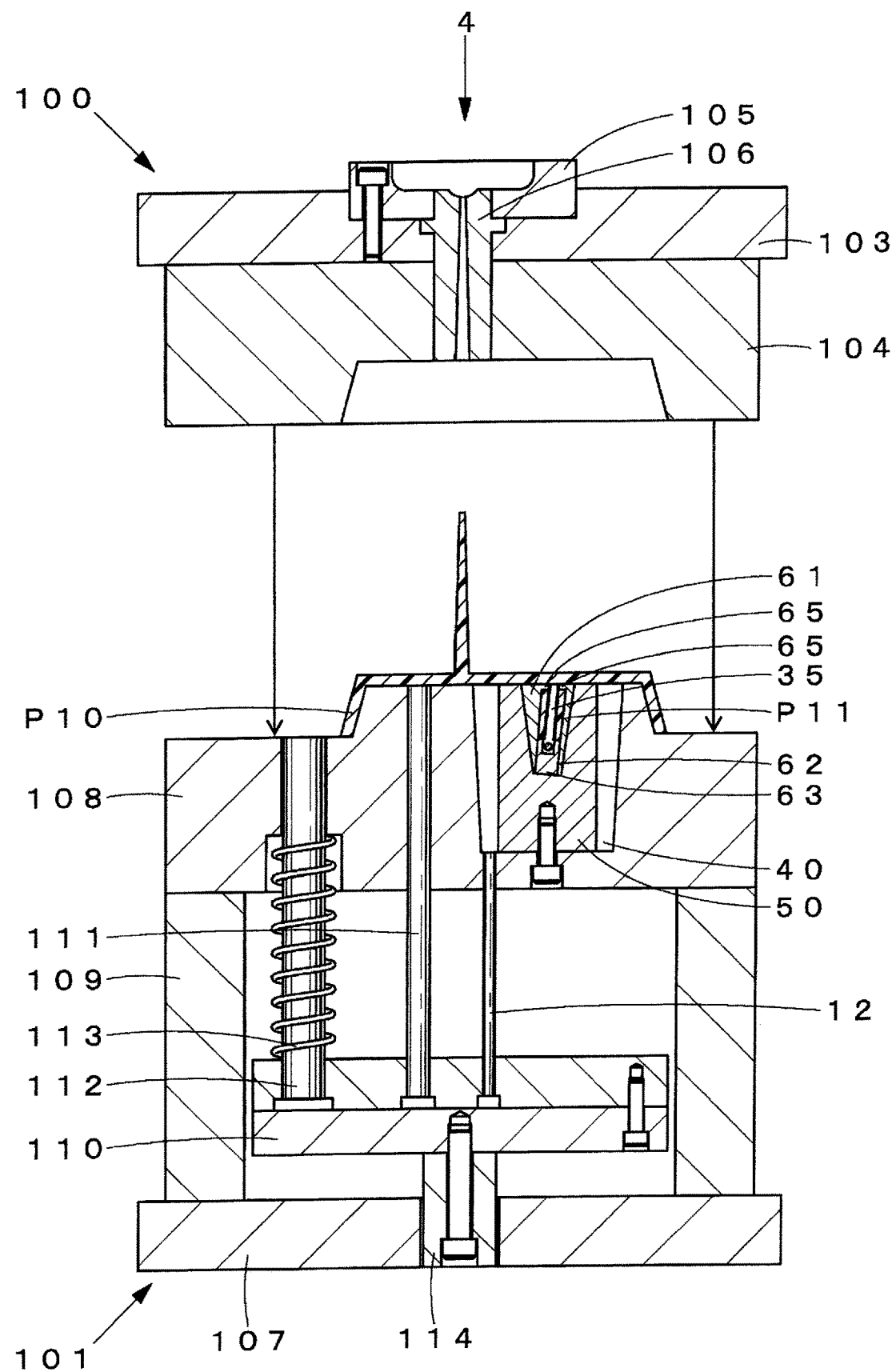
FIG. 22 is a cross-sectional view of the molding die in FIG. 21 after the molding die is opened.
Figure 23:
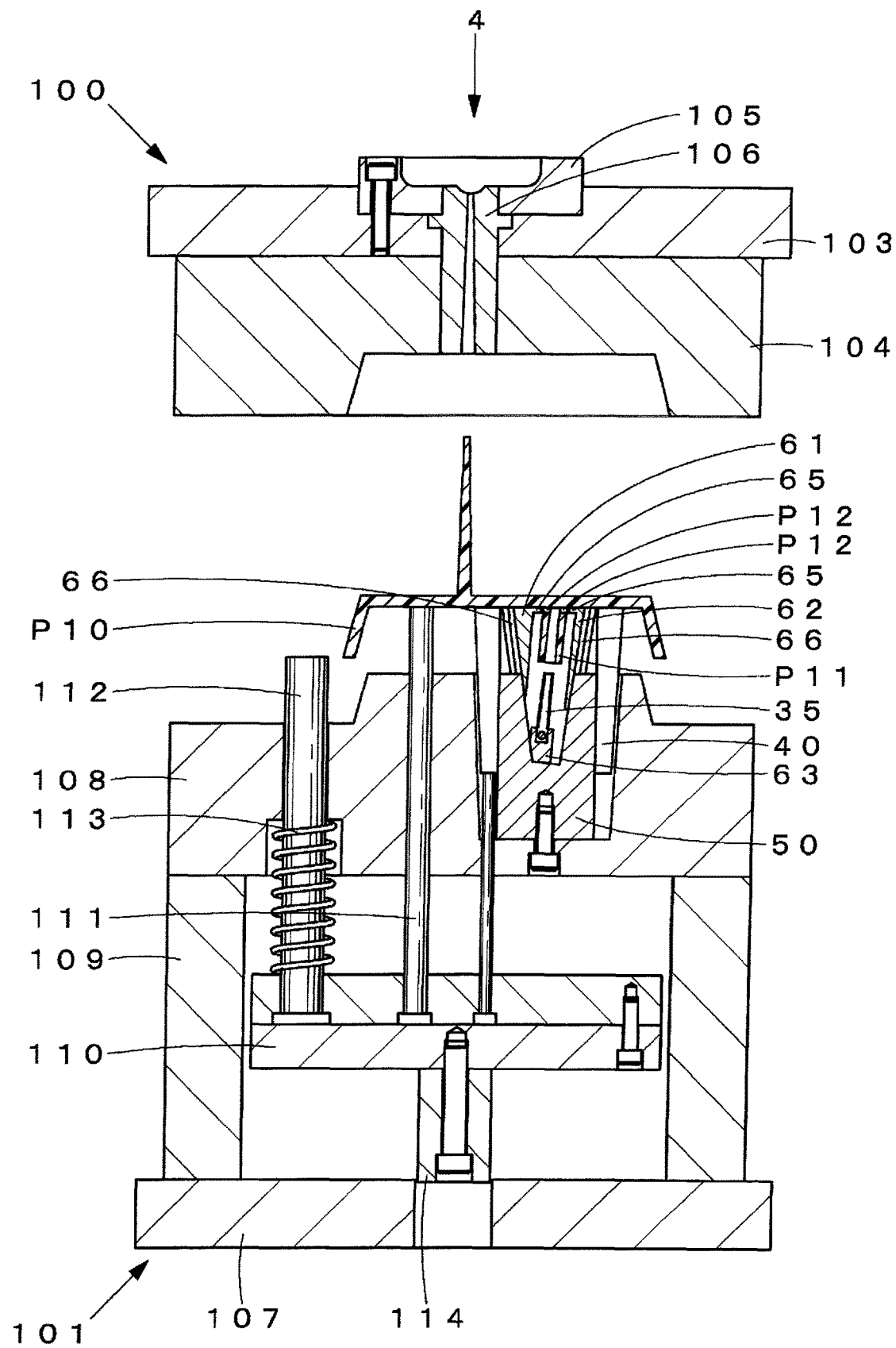
FIG. 23 is a cross-sectional view of the molding die in FIG. 21 after an operation of protruding a molded product.
Figure 24:
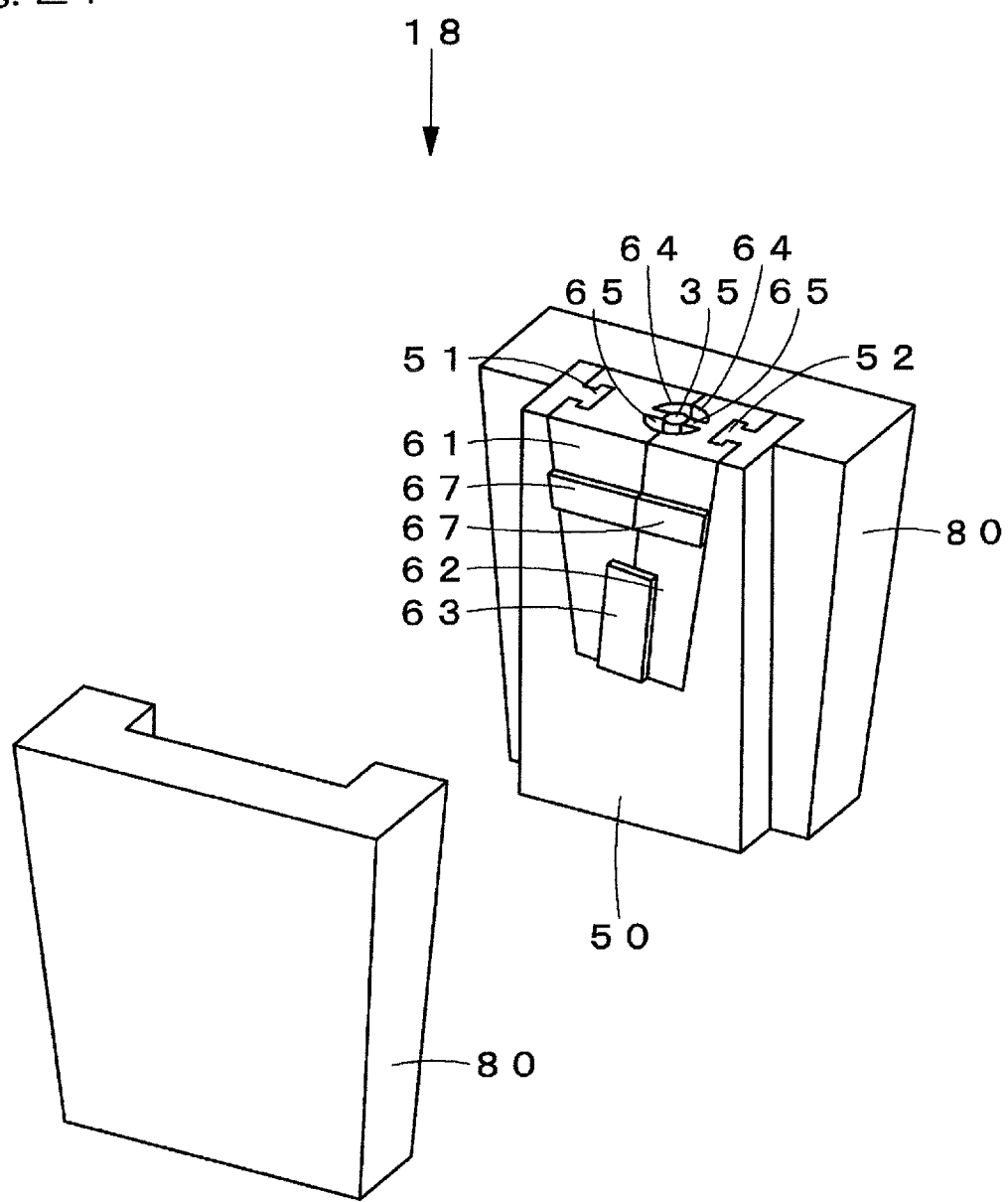
FIG. 24 is a partial exploded perspective view of an undercut processing mechanism of the molding die in FIG. 21.

FIG. 21 is a cross-sectional view of a molding die 4 according to a fourth embodiment of the present invention during clamping; FIG. 22 is a cross-sectional view of the molding die 4 in FIG. 21 after the molding die 4 is opened; FIG. 23 is a cross-sectional view of the molding die 4 in FIG. 21 after an operation of protruding a molded product P10;

and FIG. 24 is a partial exploded perspective view of an undercut processing mechanism 18 of the molding die 4 in FIG. 21.

The same components as in the molding die 2 of the second embodiment shown in FIG. 7 to FIG. 11 are denoted by the same reference numerals, and the description thereof is omitted. The molding die 4 of the fourth embodiment has the same basic configuration as the molding die 2 of the second embodiment, but a holder 80 has a side surface formed in a tapered shape. Accordingly, of the movable side molding plate 108 of the molding die 4, a portion to which the holder 80 is attached is formed in a tapered shape. The tapered portion serves to guide the holder 80 when the holder 80 is retracted into the movable side molding plate 108. Accordingly, wear or damage of the holder 80 and the movable side molding plate 108 is reduced.

Although the undercut processing mechanism, the molding die, and the molded product according to the present invention have been described by means of the molding dies 1, 2, 3, and 4 of the first to fourth embodiments, the undercut processing mechanism, the molding die, and the molded product according to the present invention are not limited to the above embodiments, and may be modified without departing from the gist of the invention and used. For example, the features of the molding dies 1, 2, 3, and 4 of the first to fourth embodiments may be combined and used as long as the combination is possible in terms of configuration.

In the undercut processing mechanism and the molding die according to the present invention, the retaining piece and the sliding piece are each not limited to a piece formed as one member, and may each be composed of a plurality of members. In the case where the retaining piece and the sliding piece are each composed of a plurality of members, the members may be connected to each other via a bolt, a knock pin or the like, or may be joined to each other without using a bolt, a knock pin or the like, for example. This configuration is not limited to the retaining piece and the sliding piece, and the same applies to each component of the molding die.

In the molding die 1 of the first embodiment, the restrictor of the holder 20 and the sliding piece 21 may be a dovetail groove and a projection. In this case, the holder 20 may be provided with the dovetail groove and the sliding piece 21 may be provided with the projection, or the holder 20 may be provided with the projection and the sliding piece 21 may be provided with the dovetail groove. Similarly, as the restrictor of the sliding piece 21 and the retaining piece 22, the sliding piece 21 may be provided with a projection, and the retaining piece 22 may be provided with a dovetail groove. The same applies to the molding dies 2, 3, and 4 of the second to fourth embodiments.

In the molding die 1 of the first embodiment, regarding the inclined groove 30 and the projections 33 that engage with each other and the dovetail groove 36 and the projection 38 that engage with each other, the cross-sectional shape of each engagement portion is not limited to the rectangular shape shown in the drawings, but may be a circle, a triangle or the like. In the undercut processing mechanism according to the present invention, the restrictor of the holder 20, the sliding piece 21 and the retaining piece 22 are not limited to the inclined groove 30, the projections 33 and 38 and the dovetail groove 36. As such a restrictor, for example, linear guides or the like may be used. The same applies to the molding dies 2, 3, and 4 of the second to fourth embodiments.

In the molding die according to the present invention, a plurality of undercut processing mechanisms may be provided. That is, with the undercut processing mechanism and the molding die according to the present invention, it is possible to form and demold a molded product having a plurality of undercut portions such as cylindrical bosses. In addition, in the case where the directions in which the respective undercut portions project, that is, the directions in which the respective undercut portions can be demolded are different from each other, the inclination angles of the restrictor such as the inclined groove, the dovetail groove and the projections of the holder, the sliding piece and the retaining piece may be set as appropriate in each undercut processing mechanism such that the corresponding undercut portion can be demolded.

In the molding dies 2, 3, and 4 of the second to fourth embodiments, the first slider 61 and the second slider 62 slide in the right-left direction in the drawings. However, the sliding direction is not limited thereto, and, as a matter of course, the molding dies 2, 3, and 4 may also be configured such that the first slider 61 and the second slider 62 slide, for example, in the front-rear (depth) direction in the drawings.

In the undercut processing mechanism and the molding die according to the present invention, the corner and the side edge of each component may be, for example, rounded or chamfered.

The materials of the components used in the undercut processing mechanism and the molding die according to the present invention are not limited to specific materials, and the same materials as those of components that are used in known undercut processing mechanisms and molding dies may be used as appropriate. However, the sliding surface of each component is preferably formed from a material having good slidability or a material that has been subjected to favorable surface treatment. Each sliding surface may be brought into line contact or point contact as well as surface contact.

The undercut processing mechanism according to the present invention can be applied to a molding die that is opened and closed in the horizontal direction, the vertical direction or another direction.

The undercut processing mechanism and the molding die according to the present invention can be suitably used for a mold die such as a die-casting die, a mold-press molding die or the like as well as an injection molding die.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS 1, 2, 3, 4 . . . molding die
10, 14, 16, 18 . . . undercut processing mechanism
20, 40, 70, 80 . . . holder
21 . . . sliding piece
22, 50 . . . retaining piece
30, 42 . . . inclined groove
33, 38, 67 . . . projection
35 . . . pin 36, 66, 69 . . . dovetail groove
41 . . . horizontal groove
51 . . . first projection
52 . . . second projection
53 . . . third projection
61 . . . first slider
62 . . . second slider
63 . . . third slider
70 . . . fixed holder
P, P10, P20, P30, P40, P50, P60 . . . molded product
P1, P2, P3, P11, P21 . . . undercut portion
P31, P41, P51, P61 . . . undercut portion

What is claimed is:

1. An undercut processing mechanism that is attached to and used in a molding die for forming a molded product having an undercut portion, the undercut processing mechanism comprising:
    a holder attached to the molding die so as to be movable in a demolding direction of the molded product, the holder having a tubular shape;
    a sliding piece slidable relative to the holder and configured to form the undercut portion; and
    a retaining piece fixed to the molding die or formed so as to be integrated with the molding die, the retaining piece slidably retaining the sliding piece, wherein
    in demolding the molded product, the sliding piece is moved in a direction in which the undercut portion is enabled to be demolded, which direction is different from the demolding direction of the molded product, by moving the holder in the demolding direction of the molded product.

2. The undercut processing mechanism as claimed in claim 1, wherein the sliding piece and the retaining piece are adjacently aligned with each other in a movement direction of the holder.

3. The undercut processing mechanism as claimed in claim 1, wherein the holder is configured to protrude the molded product during an operation of protruding the molded product.

4. The undercut processing mechanism as claimed in claim 1, the holder and the retaining piece each include a restrictor configured to restrict a movement direction of the sliding piece to the direction in which the undercut portion is enabled to be demolded.

5. The undercut processing mechanism as claimed in claim 4, wherein
    the restrictor of the holder is provided so as to engage with the sliding piece such that the sliding piece is slidable relative to the holder in the direction in which the undercut portion is enabled to be demolded, and the restrictor of the retaining piece is provided so as to engage with the sliding piece such that the sliding piece is slidable relative to the retaining piece in a direction perpendicular to the direction in which the undercut portion is enabled to be demolded.

6. The undercut processing mechanism as claimed in claim 1, wherein the sliding piece includes a molding member configured to form a hollow portion or a space portion of the undercut portion so as to form the molded product having the hollow portion or the space portion in the undercut portion.

7. The undercut processing mechanism as claimed in claim 1, wherein
    the sliding piece includes a plurality of split sliders, and
    at least two of the plurality of sliders move in directions that are different from a movement direction of the holder and that are different from each other, during movement of the holder.

8. The undercut processing mechanism as claimed in claim 1, further comprising an outer holder fixed to the molding die and configured to slide the holder, so as to prevent wear of the molding die.

9. The undercut processing mechanism as claimed in claim 1, wherein the holder has an outer peripheral surface that is a sliding surface and that is partially or entirely formed in a tapered shape, so as to prevent wear of the outer peripheral surface and/or the molding die.

10. A molding die comprising the undercut processing mechanism as claimed in claim 1.

11. The undercut processing mechanism as claimed in claim 2, wherein
    a dovetail groove is formed at one of: a surface of the sliding piece, which surface is adjacently aligned with the retaining piece; and a surface of the retaining piece, which surface is adjacently aligned with the sliding piece;
    a projection is formed at the other of: the surface of the sliding piece, which surface is adjacently aligned with the retaining piece; and the surface of the retaining piece, which surface is adjacently aligned with the sliding piece; and
    the dovetail groove and the projection form a restrictor that restricts a sliding direction of the sliding piece to the direction in which the undercut portion is enabled to be demolded.

12. The undercut processing mechanism as claimed in claim 1, wherein the direction in which the undercut portion is enabled to be demolded intersects the demolding direction of the molded product.

* * * * *